US011409870B2

(12) United States Patent
Gupta

(10) Patent No.: US 11,409,870 B2
(45) Date of Patent: Aug. 9, 2022

(54) SYSTEMS AND METHODS FOR REMEDIATING MEMORY CORRUPTION IN A COMPUTER APPLICATION

(71) Applicant: Virsec Systems, Inc., San Jose, CA (US)

(72) Inventor: Satya Vrat Gupta, Dublin, CA (US)

(73) Assignee: Virsec Systems, Inc., San Jose, CA (US)

( * ) Notice: Subject to any disclaimer, the term of this patent is extended or adjusted under 35 U.S.C. 154(b) by 249 days.

(21) Appl. No.: 16/307,281

(22) PCT Filed: Jun. 16, 2017

(86) PCT No.: PCT/US2017/037841
§ 371 (c)(1),
(2) Date: Dec. 5, 2018

(87) PCT Pub. No.: WO2017/218872
PCT Pub. Date: Dec. 21, 2017

(65) Prior Publication Data
US 2019/0138725 A1 May 9, 2019

Related U.S. Application Data

(60) Provisional application No. 62/350,917, filed on Jun. 16, 2016.

(51) Int. Cl.
*G06F 21/56* (2013.01)
*G06F 21/51* (2013.01)
(Continued)

(52) U.S. Cl.
CPC ............ *G06F 21/566* (2013.01); *G06F 9/485* (2013.01); *G06F 21/51* (2013.01); *G06F 21/54* (2013.01);
(Continued)

(58) Field of Classification Search
CPC ........ G06F 21/566; G06F 21/51; G06F 21/54; G06F 21/62; G06F 9/485; H04L 63/1433; H04L 63/1441
See application file for complete search history.

(56) References Cited

U.S. PATENT DOCUMENTS

| 4,080,650 A | 3/1978 | Beckett |
| 4,215,406 A | 7/1980 | Gomola et al. |

(Continued)

FOREIGN PATENT DOCUMENTS

| CN | 101154258 A | 4/2008 |
| CN | 102012987 A | 4/2011 |

(Continued)

OTHER PUBLICATIONS

"Multi-tier Application Database Debugging," Jun. 2011. Visual Studio 2005. Retrieved from Internet: Dec. 5, 2016. http://msdn.microsoft.com/en-us/library/ms165059(v=vs.80).aspx.

(Continued)

*Primary Examiner* — Khoi V Le
(74) *Attorney, Agent, or Firm* — Hamilton, Brook, Smith & Reynolds, P.C.

(57) ABSTRACT

In example embodiments, systems and methods extract a model of a computer application during load time and store the model in memory. Embodiments may insert instructions into the computer application at run time to collect runtime state of the application, and analyze the collected data against the stored model to perform detection of security events. Embodiments may also instrument an exception handler to detect the security events based on unhandled memory access violations. Embodiments may, based upon the detection of the security events, dynamically respond, such as by modify a computer routine associated with an active process of the computer application. Modification (Continued)

may include installing or verifying an individual patch in memory associated with the computer application.

32 Claims, 16 Drawing Sheets

(51) Int. Cl.
  *G06F 21/54* (2013.01)
  *G06F 9/48* (2006.01)
  *H04L 9/40* (2022.01)
  *G06F 21/62* (2013.01)

(52) U.S. Cl.
  CPC ...... *H04L 63/1433* (2013.01); *H04L 63/1441* (2013.01); *G06F 21/62* (2013.01)

(56) References Cited

U.S. PATENT DOCUMENTS

| | | | |
|---|---|---|---|
| 4,466,077 A | 8/1984 | Iannucci et al. |
| 4,672,534 A | 6/1987 | Kamiya |
| 4,751,667 A | 6/1988 | Ross |
| 4,803,720 A | 2/1989 | Newell et al. |
| 4,910,663 A | 3/1990 | Bailey |
| 5,161,193 A | 11/1992 | Lampson et al. |
| 5,179,702 A | 1/1993 | Spix et al. |
| 5,222,220 A | 6/1993 | Mehta |
| 5,224,160 A | 6/1993 | Paulini et al. |
| 5,235,551 A | 8/1993 | Sinofsky et al. |
| 5,297,274 A | 3/1994 | Jackson |
| 5,321,828 A | 6/1994 | Phillips et al. |
| 5,359,659 A | 10/1994 | Rosenthal |
| 5,390,309 A | 2/1995 | Onodera |
| 5,440,723 A | 8/1995 | Arnold et al. |
| 5,533,192 A | 7/1996 | Hawley et al. |
| 5,611,043 A | 3/1997 | Even et al. |
| 5,680,542 A | 10/1997 | Mulchandani et al. |
| 5,684,948 A | 11/1997 | Johnson et al. |
| 5,784,552 A | 7/1998 | Bishop et al. |
| 5,826,012 A | 10/1998 | Lettvin |
| 5,829,039 A | 10/1998 | Sugino et al. |
| 5,850,559 A | 12/1998 | Angelo et al. |
| 5,873,124 A | 2/1999 | Draves |
| 5,890,005 A | 3/1999 | Lindholm |
| 5,909,580 A | 6/1999 | Crelier et al. |
| 5,933,594 A | 8/1999 | La Joie et al. |
| 5,978,584 A | 11/1999 | Nishibata et al. |
| 5,983,348 A | 11/1999 | Ji |
| 6,077,312 A | 6/2000 | Bates et al. |
| 6,119,206 A | 9/2000 | Tatkar et al. |
| 6,134,652 A | 10/2000 | Warren |
| 6,151,618 A | 11/2000 | Wahbe et al. |
| 6,178,522 B1 | 1/2001 | Zhou et al. |
| 6,237,137 B1 | 5/2001 | Beelitz |
| 6,240,501 B1 | 5/2001 | Hagersten |
| 6,263,489 B1 | 7/2001 | Olsen et al. |
| 6,275,893 B1 | 8/2001 | Bonola |
| 6,516,408 B1 | 2/2003 | Abiko et al. |
| 6,553,429 B1 | 4/2003 | Wentz et al. |
| 6,665,316 B1 | 12/2003 | Eidson |
| 6,775,780 B1 | 8/2004 | Muttik |
| 6,782,478 B1 | 8/2004 | Probert |
| 6,832,302 B1 | 12/2004 | Fetzer et al. |
| 6,895,508 B1 | 5/2005 | Swanberg |
| 6,948,091 B2 | 9/2005 | Bartels et al. |
| 6,973,577 B1 | 12/2005 | Kouznetsov |
| 6,981,176 B2 | 12/2005 | Fruehling et al. |
| 7,181,585 B2 | 2/2007 | Abrashkevich |
| 7,257,763 B1 | 8/2007 | Srinivasan et al. |
| 7,260,845 B2 | 8/2007 | Kedma |
| 7,272,748 B1 | 9/2007 | Conover et al. |
| 7,281,225 B2 | 10/2007 | Jain et al. |
| 7,284,276 B2 | 10/2007 | Conover |
| 7,328,323 B1 | 2/2008 | Conover |
| 7,353,501 B2 | 4/2008 | Tang et al. |
| 7,380,245 B1 | 5/2008 | Lovette |
| 7,383,166 B2 | 6/2008 | Ashar et al. |
| 7,386,839 B1 | 6/2008 | Golender et al. |
| 7,453,910 B1 | 11/2008 | Biberstein et al. |
| 7,480,919 B2 | 1/2009 | Bray |
| 7,484,239 B1 | 1/2009 | Tester et al. |
| 7,490,268 B2 | 2/2009 | Keromytis et al. |
| 7,526,654 B2 | 4/2009 | Charbonneau |
| 7,526,755 B2 | 4/2009 | DeLine et al. |
| 7,539,875 B1 | 5/2009 | Manferdelli et al. |
| 7,555,747 B1 | 6/2009 | Agesen |
| 7,594,111 B2 | 9/2009 | Kiriansky et al. |
| 7,603,704 B2 | 10/2009 | Bruening |
| 7,603,715 B2 | 10/2009 | Costa et al. |
| 7,613,954 B2 | 11/2009 | Grey et al. |
| 7,634,812 B2 | 12/2009 | Costa et al. |
| 7,644,440 B2 | 1/2010 | Sinha et al. |
| 7,730,305 B2 | 6/2010 | Eun et al. |
| 7,747,725 B2 | 6/2010 | Williams et al. |
| 7,853,803 B2 | 12/2010 | Milliken |
| 7,895,651 B2 | 2/2011 | Brennan |
| 7,971,044 B2 | 6/2011 | Dieffenderfer et al. |
| 7,971,255 B1 | 6/2011 | Kc et al. |
| 8,042,180 B2 | 10/2011 | Gassoway |
| 8,151,117 B2 | 4/2012 | Hicks |
| 8,261,326 B2 | 9/2012 | Ben-Natan |
| 8,286,238 B2 | 10/2012 | Durham et al. |
| 8,307,191 B1 | 11/2012 | Jain |
| 8,336,102 B2 | 12/2012 | Neystadt et al. |
| 8,353,040 B2 | 1/2013 | Tahan |
| 8,407,523 B2 | 3/2013 | Stewart et al. |
| 8,510,596 B1 | 8/2013 | Gupta et al. |
| 8,954,738 B2 | 2/2015 | Asokan et al. |
| 8,958,546 B2 | 2/2015 | Probert |
| 8,966,312 B1 | 2/2015 | Gupta et al. |
| 9,230,455 B2 | 1/2016 | Probert |
| 9,418,227 B2 | 8/2016 | Franklin |
| 9,516,053 B1* | 12/2016 | Muddu ............... H04L 63/1433 |
| 10,079,841 B2 | 9/2018 | Gupta et al. |
| 10,114,726 B2 | 10/2018 | Gupta |
| 10,331,888 B1 | 6/2019 | Gupta et al. |
| 10,354,074 B2 | 7/2019 | Gupta |
| 11,113,407 B2 | 9/2021 | Gupta |
| 11,146,572 B2 | 10/2021 | Gupta et al. |
| 2001/0013094 A1 | 8/2001 | Etoh |
| 2001/0023479 A1 | 9/2001 | Kimura et al. |
| 2001/0033657 A1 | 10/2001 | Lipton et al. |
| 2001/0047510 A1 | 11/2001 | Angel et al. |
| 2002/0129226 A1 | 9/2002 | Eisen et al. |
| 2002/0138554 A1 | 9/2002 | Feigen et al. |
| 2002/0169999 A1 | 11/2002 | Bhansali |
| 2003/0014667 A1 | 1/2003 | Kolichtchak |
| 2003/0023865 A1 | 1/2003 | Cowie et al. |
| 2003/0028755 A1 | 2/2003 | Ohsawa et al. |
| 2003/0033498 A1 | 2/2003 | Borman et al. |
| 2003/0041290 A1 | 2/2003 | Peleska |
| 2003/0079158 A1 | 4/2003 | Tower et al. |
| 2003/0120884 A1 | 6/2003 | Koob et al. |
| 2003/0120885 A1 | 6/2003 | Bonola |
| 2003/0145253 A1 | 7/2003 | de Bonet |
| 2003/0188160 A1 | 10/2003 | Sunder et al. |
| 2003/0188174 A1 | 10/2003 | Zisowski |
| 2003/0191940 A1 | 10/2003 | Sinha et al. |
| 2003/0212913 A1 | 11/2003 | Vella |
| 2003/0217255 A1 | 11/2003 | Wyatt |
| 2003/0217277 A1 | 11/2003 | Narayanan |
| 2004/0049660 A1 | 3/2004 | Jeppesen et al. |
| 2004/0103252 A1 | 5/2004 | Lee et al. |
| 2004/0117682 A1 | 6/2004 | Xu |
| 2004/0120173 A1 | 6/2004 | Regev et al. |
| 2004/0133777 A1 | 7/2004 | Kiriansky et al. |
| 2004/0157639 A1 | 8/2004 | Morris et al. |
| 2004/0162861 A1 | 8/2004 | Detlefs |
| 2004/0168078 A1 | 8/2004 | Brodley |
| 2004/0215755 A1 | 10/2004 | O'Neill |
| 2004/0221120 A1 | 11/2004 | Abrashkevich et al. |
| 2004/0268095 A1 | 12/2004 | Shpeisman et al. |
| 2004/0268319 A1 | 12/2004 | Tousignant |
| 2005/0010804 A1 | 1/2005 | Bruening |

(56) References Cited

U.S. PATENT DOCUMENTS

| | | |
|---|---|---|
| 2005/0022153 A1 | 1/2005 | Hwang |
| 2005/0028048 A1 | 2/2005 | New et al. |
| 2005/0033980 A1 | 2/2005 | Willman et al. |
| 2005/0039178 A1 | 2/2005 | Marolia et al. |
| 2005/0055399 A1 | 3/2005 | Savchuk |
| 2005/0071633 A1 | 3/2005 | Rothstein |
| 2005/0086502 A1 | 4/2005 | Rayes et al. |
| 2005/0108562 A1 | 5/2005 | Khazan et al. |
| 2005/0132179 A1 | 6/2005 | Glaum et al. |
| 2005/0138409 A1 | 6/2005 | Sheriff et al. |
| 2005/0144471 A1 | 6/2005 | Shupak et al. |
| 2005/0144532 A1 | 6/2005 | Dombrowa et al. |
| 2005/0172115 A1 | 8/2005 | Bodorin et al. |
| 2005/0195748 A1 | 9/2005 | Sanchez |
| 2005/0210275 A1 | 9/2005 | Homing et al. |
| 2005/0223238 A1 | 10/2005 | Schmid et al. |
| 2005/0246522 A1* | 11/2005 | Samuelsson ............ G06F 21/53 713/150 |
| 2005/0273854 A1 | 12/2005 | Chess et al. |
| 2005/0283601 A1 | 12/2005 | Tahan |
| 2005/0283835 A1 | 12/2005 | Lalonde et al. |
| 2005/0289527 A1 | 12/2005 | Illowsky et al. |
| 2006/0002385 A1 | 1/2006 | Johnsen et al. |
| 2006/0020936 A1 | 1/2006 | Wyatt |
| 2006/0021035 A1 | 1/2006 | Conti et al. |
| 2006/0026311 A1 | 2/2006 | Nicolai et al. |
| 2006/0075274 A1 | 4/2006 | Zimmer et al. |
| 2006/0095895 A1 | 5/2006 | K. |
| 2006/0126799 A1 | 6/2006 | Burk |
| 2006/0143707 A1 | 6/2006 | Song et al. |
| 2006/0155905 A1 | 7/2006 | Leino et al. |
| 2006/0161583 A1 | 7/2006 | Burka et al. |
| 2006/0195745 A1 | 8/2006 | Keromytis et al. |
| 2006/0212837 A1 | 9/2006 | Prasad |
| 2006/0242703 A1 | 10/2006 | Abeni |
| 2006/0245588 A1 | 11/2006 | Hatakeyama |
| 2006/0248519 A1 | 11/2006 | Jaeger et al. |
| 2006/0265438 A1 | 11/2006 | Shankar et al. |
| 2006/0271725 A1 | 11/2006 | Wong |
| 2006/0282891 A1 | 12/2006 | Pasko |
| 2007/0011686 A1 | 1/2007 | Ben-Zvi |
| 2007/0016953 A1 | 1/2007 | Morris |
| 2007/0027815 A1 | 2/2007 | Sobel et al. |
| 2007/0050848 A1 | 3/2007 | Khalid |
| 2007/0067359 A1 | 3/2007 | Barrs et al. |
| 2007/0118646 A1 | 5/2007 | Gassoway |
| 2007/0136455 A1 | 6/2007 | Lee et al. |
| 2007/0157003 A1 | 7/2007 | Durham et al. |
| 2007/0169075 A1 | 7/2007 | Lill et al. |
| 2007/0174549 A1 | 7/2007 | Gyl |
| 2007/0174703 A1 | 7/2007 | Gritter et al. |
| 2007/0180260 A1* | 8/2007 | Crescenzo ............ G06F 21/31 713/183 |
| 2007/0192854 A1 | 8/2007 | Kelley et al. |
| 2007/0274311 A1 | 11/2007 | Yang |
| 2007/0283135 A1 | 12/2007 | Noda et al. |
| 2008/0016339 A1* | 1/2008 | Shukla ................ G06F 21/566 713/164 |
| 2008/0027701 A1 | 1/2008 | Inaishi et al. |
| 2008/0215925 A1 | 9/2008 | Degenaro et al. |
| 2008/0250496 A1 | 10/2008 | Namihira |
| 2008/0263505 A1 | 10/2008 | StClair et al. |
| 2008/0301647 A1 | 12/2008 | Neystadt et al. |
| 2009/0144698 A1 | 6/2009 | Fanning et al. |
| 2009/0158075 A1 | 6/2009 | Biberstein et al. |
| 2009/0217377 A1 | 8/2009 | Arbaugh et al. |
| 2009/0290226 A1 | 11/2009 | Asakura et al. |
| 2010/0005531 A1 | 1/2010 | Largman et al. |
| 2010/0064111 A1 | 3/2010 | Kunimatsu et al. |
| 2010/0153785 A1 | 6/2010 | Keromytis et al. |
| 2010/0287535 A1 | 11/2010 | Kim et al. |
| 2012/0166878 A1 | 6/2012 | Sinha et al. |
| 2012/0192053 A1 | 7/2012 | Waltenberger |
| 2012/0239857 A1 | 9/2012 | Jibbe et al. |
| 2012/0284697 A1 | 11/2012 | Choppakatla et al. |
| 2013/0086020 A1 | 4/2013 | Addala |
| 2013/0086550 A1 | 4/2013 | Epstein |
| 2013/0111547 A1 | 5/2013 | Kraemer |
| 2013/0239215 A1 | 9/2013 | Kaufman |
| 2013/0250965 A1 | 9/2013 | Yakan |
| 2013/0333040 A1* | 12/2013 | Diehl ................ H04L 41/0803 726/22 |
| 2014/0047282 A1 | 2/2014 | Deb et al. |
| 2014/0108803 A1 | 4/2014 | Probert |
| 2014/0237599 A1 | 8/2014 | Gertner et al. |
| 2014/0304815 A1 | 10/2014 | Maeda |
| 2014/0337639 A1 | 11/2014 | Probert |
| 2015/0039717 A1 | 2/2015 | Chiu et al. |
| 2015/0163242 A1* | 6/2015 | Laidlaw ............ H04L 63/1433 726/22 |
| 2016/0094349 A1 | 3/2016 | Probert |
| 2016/0212159 A1 | 7/2016 | Gupta et al. |
| 2017/0063886 A1* | 3/2017 | Muddu ................ H04L 63/06 |
| 2017/0063888 A1* | 3/2017 | Muddu ................ H04L 41/145 |
| 2017/0123957 A1 | 5/2017 | Gupta |
| 2017/0132419 A1 | 5/2017 | Gupta |
| 2018/0324195 A1 | 11/2018 | Gupta et al. |
| 2020/0042714 A1 | 2/2020 | Gupta |

FOREIGN PATENT DOCUMENTS

| | | |
|---|---|---|
| EP | 1 085 418 | 3/2001 |
| EP | 1 703 395 | 9/2006 |
| EP | 1758021 A2 | 2/2007 |
| JP | 2003330736 | 11/2003 |
| JP | 2004287810 | 10/2004 |
| JP | 2005258498 | 9/2005 |
| JP | 2005276185 | 10/2005 |
| JP | 2006053760 | 2/2006 |
| JP | 2008-129714 A | 6/2008 |
| JP | 2009031859 | 2/2009 |
| JP | 2010257150 | 11/2010 |
| JP | 2011059930 | 3/2011 |
| JP | 2011198022 | 10/2011 |
| JP | 2014531647 | 11/2014 |
| WO | WO 2010/067703 | 6/2010 |
| WO | 2014021190 | 2/2014 |
| WO | WO 2015/038944 | 3/2015 |
| WO | 2015200046 A1 | 12/2015 |
| WO | WO 2015/200508 | 12/2015 |
| WO | WO 2015/200511 | 12/2015 |
| WO | WO 2017/218872 | 12/2017 |

OTHER PUBLICATIONS

"Software Instrumentation," edited by Wah, B., Wiley Encyclopedia of Computer Science and Engineer, Wiley, pp. 1-11, XP007912827, Jan. 1, 2008.

"Troubleshooting n-tier." Apr. 2011. Retrieved from Internet: http://drc.ideablade.com/xwiki/bin/view/Documentation/deploy-troubleshooting-ntier.

Aarniala, J., "Instrumenting Java bytecode," Seminar work for the Compilers-course, Department of Computer Science University of Helsinki, Finland (Spring 2005).

Ashcraft, K. and Engler, D., "Using Programmer-Written Compiler Extensions to Catch Security Holes," Slides presented at the Proceedings of the IEEE Symposium on Security and Privacy, Berkeley, CA, pp. 1-14, (May 2002).

Austin, T., et al., "Efficient Detection of All Pointer and Array Access Errors," Proceedings of the ACM SIGPLAN 94 Conference on Programming Language Design and Implementation, Orlando, FL, 12 pages (Jun. 1994).

Baratloo, A., et al., "Transparent Run-Time Defense Against Stack Smashing Attacks," Proceedings of the USENIX 2000 Annual Technical Conference, San Diego, CA, 12 pages (Jun. 2000).

Barrantes, E., et al., "Randomized Instruction Set Emulation to Disrupt Binary Code Injection Attacks," Proceedings of the 10th Annual ACM Conference on Computer and Communications Security, Washington, DC, 10 pages (Oct. 2003).

Berger, E. and Zorn, B., "Diehard: Probabilistic Memory Safety for Unsafe Languages," Proceedings of the Programming Language Design and Implementation (PLDI), 11 pages (Jun. 2006).

(56) References Cited

OTHER PUBLICATIONS

Bernat, A.R. et al., "Anywhere, Any-Time Binary Instrumentation," Proceedings of the 10th ACM SIGPLAN-SIGSOFT workshop on Program analysis for software tools (PASTE). ACM, Szeged, Hungary (Sep. 2011).
Bhatkar, S., et al., Address Obfuscation: An Efficient Approach to Combat a Broad Range of Memory Error Exploits, Proceedings of the 12th USENIX Security Symposium, Washington, DC, 16 pages (Aug. 2003).
Buck, B., et al., "An API For Runtime Code Patching," Jan. 1, 2000, vol. 14, No. 4, pp. 317-329, XP008079534, p. 317, Jan. 1, 2000.
Bush, W., et al., "A Static Analyzer for Finding Dynamic Programming Errors," Software: Practice and Experience, 30(7): 775-802 (2000).
Chew, M. and Song, D., "Mitigating Buffer Overflows by Operating System Randomization," (Report No. CMU-CS-02-197), Carnegie Mellon University, 11 pages (Dec. 2002).
Chiueh, T. and Hsu, F., "RAD: A Compile-Time Solution to Buffer Overflow Attacks," Proceedings of the 21st International Conference on Distributed Computing Systems, Pheonix, AZ, 20 pages (Apr. 2001).
Cowan, C., et al., "FormatGuard: Automatic Protection from Printf Format String Vulnerabilities," Proceedings of the 10th USENIX Security Symposium, Washington, DC, 9 pages (Aug. 2001).
Cowan, C., et al., "PointGuardTM: Protecting Pointers From Buffer Overflow Vulnerabilities," Proceedings of the 12th USENIX Security Symposium, Washington, DC, 15 pages (Aug. 2003).
Cowan, C., et al., "Protecting Systems from Stack Smashing Attacks with StackGuard," Linux Expo, Raleigh, NC, 11 pages (May 1999).
Cowan, C., et al., "Stackguard: Automatic Adaptive Detection and Prevention of Buffer-Overflow Attacks," Proceedings of the 7th USENIX Security Conference, San Antonio, TX, 16 pages (Jan. 1998).
Dhurjati, D., et al., "Memory Safety Without Runtime Checks or Garbage Collection," Proceedings of the 2003 ACM SIGPLAN Conference on Language, Compiler, and Tool Support for Embedded Systems, San Diego, CA, 12 pages (Jun. 2003).
Dor, S., et al., "Cleanness Checking of String Manipulation in C Programs via Integer Analysis," Proceedings of the $8^{th}$ International Static Analysis Symposium, Paris, France, Springer LNCS 2126:194-212 (2002).
Engler, D., et al., "Checking System Rules Using System-Specific, Programmer-Written Compiler Extensions," Stanford University, 16 pages (Oct. 2000).
Erlingsson, U. and Schneider, F., "SASI Enforcement of Security Policies: A Retrospective," Proceedings of the New Security Paradigm Workshop, Caledon Hills, Ontario, Canada, (Sep. 1999).
Etoh, H. and Yoda, K., "Protecting from Stack-Smashing Attacks," IBM Research Division, Tokyo Research Laboratory, Jun. 2000, www.trl.ibm.com, 23 pages, retrieved from Internet Nov. 6, 2007.
Evans, D. and Larachelle D., "Improving Security Using Extensible Lightweight Static Analysis," IEEE Software, 19(1):43-51 (Jan.-Feb. 2002).
Evans, D., "Policy-Directed Code Safety," Department of Electrical Engineering and Computer Science, Massachusetts Institute of Technology, 135 pages, Oct. 1999.
Evans, D., "Policy-Directed Code Safety," Proceedings of the IEEE Symposium on Security and Privacy, Oakland, CA, (May 1999).
Feng, H., et al., "Anomaly Detection using Call Stack Information," IEEE Security and Privacy, Oakland, CA, 14 pages (May 2003).
Fink, G. and Bishop, M., "Property-Based Testing: A New Approach to Testing for Assurance," ACM SIGSOFT Software Engineering Notes, 22(4): 74-80 (Jul. 1997).
Forrest, S., et al., "A Sense of Self for Unix Processes," Proceedings of the IEEE Symposium on Security and Privacy, Oakland, CA, 9 pages (May 1996).
Foster, J., et al., "A Theory of Type Qualifiers," Proceedings of the 1999 ACM SIGPLAN Conference on Programming Language Design and Implementation (PLDI), Atlanta, GA, 12 pages (May 1999).
Frantzen, M. and Shuey, M., "StackGhost: Hardware Facilitated Stack Protection," Proceedings of the 10th USENIX Security Symposium, Washington, DC, 11 pages (Aug. 2001).
Ganapathy, V., et al., "Buffer Overrun Detection using Linear Programming and Static Analysis," Proceedings of the 10th ACM Conference on Computer and Communication Security, Washington D.C, 10 pages (Oct. 2003).
Gaurav, S., et al., "Countering Code-Injection Attacks With Instruction-Set Randomization," Proceedings of the 10th ACM Conference on Computer and Communications Security (CCS2003), Washington, DC, 9 pages (Oct. 2003).
Ghosh, A.K. and O'Connor, T., "Analyzing Programs for Vulnerability to Buffer Overrun Attacks," Proceedings of the 21st NIST-NCSC National Information Systems Security Conference, 9 pages (Oct. 1998).
Goldberg, I., et al.., "A Secure Environment for Untrusted Helper Applications," Proceedings of the 6th USENIX Security Symposium, San Jose, CA, 13 pages (Jul. 1996).
Gravelle, R., "Debugging JavaScript: Beyond Alerts." Retrieved from Internet: Jun. 2009. http://www.webreference.com/programming/javascript/rg34/index.html.
Grimes, R., "Preventing Buffer Overruns in C++," Dr Dobb's Journal: Software Tools for the Professional Programmer, 29(1): 49-52 (Jan. 2004).
Hastings, R. and Joyce, B., "Purify: Fast Detection of Memory Leaks and Access Errors," Proceedings of the Winter 92 USENIX Conference, San Francisco, CA, 10 pages (Jan. 1992).
Haugh, E. and Bishop, M., "Testing C Programs for Buffer Overflow Vulnerabilities," Proceedings of the 10th Network and Distributed System Security Symposium (NDSS03), San Diego, CA, 8 pages (Feb. 2003).
Howard, M., "Protecting against Pointer Subterfuge (Kinda!)," Jan. 2006, 4 pages, [retrieved from Internet Feb. 26, 2016] http://blogs.msdn.com/b/michael_howard/archive/2006/01/30/520200.aspx.
http://bochs.sourceforge.net, The Open Source IA-32, 59 pages, retrieved from Internet Nov. 15, 2007.
Hunt, G. and Brubacher, D., "Detours: Binary Interception of Win32 Functions," Jul. 1999, 9 pages, Retrieved from the Internet: https://www.microsoft.com/en-us/research/publication/detours-binary-interception-of-win32-functions/.
International Search Report and Written Opinion, dated Nov. 13, 2017, for International Application No. PCT/US2017/037841, entitled "Systems And Methods For Remediating Memory Corruption In A Computer Application," consisting of 20 pages.
Jim, T., et al., "Cyclone: A safe dialect of C," Proceedings of the USENIX Annual Technical Conference, Monterey, CA, 14 pages (Jun. 2002).
Jones, Richard W. M. and Kelly, Paul H. J., "Backwards-Compatible Bounds Checking For Arrays and Pointers in C Programs," Proceedings of the 3rd International Workshop on Automatic Debugging, Linkoping, Sweden, 29 pages (May 1997).
Kendall, Samuel C., "Bcc: Runtime Checking for C Programs," Proceedings of the USENIX Summer 1983 Conference, Toronto, Ontario, Canada, 14 pages, (Jul. 1983).
Kiriansky, V. , et al., "Secure Execution Via Program Shepherding," Proceedings of the 11th USENIX Security Symposium, San Francisco, CA, 16 pages (Aug. 2002).
Krennmair, A., "ContraPolice: a libc Extension for Protecting Applications from Heap-Smashing Attacks," www.synflood.at/contrapolice, 5 pages, retrieved from Internet, Nov. 28, 2003.
Lamport, Leslie, "Operating Time, Clocks, and the Ordering of Events in a Distributed System," Jul. 1978, Retrieved from the Internet: http://research.microsoft.com/en-us/um, pp. 558-565.
Larochelle, D. and Evans, D., "Statically Detecting Likely Buffer Overflow Vulnerabilities," 2001 USENIX Security Symposium, Washington, D. C., 13 pages (Aug. 2001).
Larson, E. and Austin, T., "High Coverage Detection of Input-Related Security Faults," Proceedings of the 12th USENIX Security Symposium, Washington, District of Columbia, U.S.A, 16 pages (Aug. 2003).
Larus, J. R., et al., "Righting Software," IEEE Software, 21(3): 92-100 (May 2004).

(56) References Cited

OTHER PUBLICATIONS

Lee, R. B., et al., "Enlisting Hardware Architecture to Thwart Malicious Code Injection," First International Conference on Security in Pervasive Computing, LNCS vol. 2802, pp. 237-252, (Mar. 2003).
Lhee, K. and Chapin, S., "Buffer Overflow and Format String Overflow Vulnerabilities," Software-Practice and Experience, 33(5): 423-460 (Apr. 2003).
Lhee, K. and Chapin, S., "Type-Assisted Dynamic Buffer Overflow Detection," Proceedings of the 11th USENIX Security Symposium, San Francisco, CA, 9 pages (Aug. 2002).
Lyashko, A., "Hijack Linux System Calls: Part II. Miscellaneous Character Drivers," Oct. 2011, 6 pages [retrieved from Internet Feb. 26, 2016] http://syprog.blogspot.com/2011/10/hijack-linux-system-calls-part-ii.html.
Messier, M. and Viega, J., "Safe C String Library V1.0.3.," www.zork.org/safestr, 33 pages, retrieved from Internet, Nov. 2003.
Necula, G., et al., "CCured: Type-Safe Retrofitting of Legacy Code," 29th SIGPLAN-SIGACT Symposium on Principles of Programming Languages (POPL), Portland, OR, pp. 128-139 (Jan. 2002).
Nergal, "The advanced return-into-libc exploits, PaX Case Study," Phrack Magazine, 58(4), 30 pages (Dec. 2001).
Oiwa, Y, et al., "Fail-Safe ANSI-C Compiler: An Approach to Making C Programs Secure," Proceedings of the International Symposium on Software Security, Tokyo, Japan, 21 pages (Nov. 2002).
Ozdoganoglu, H., et al., "SmashGuard: A Hardware Solution to Prevent Security Attacks on the Function Return Address," (Report No. TR-ECE 03-13), Purdue University, 37 pages (Nov. 2003).
Perens, Electric Fence Malloc Debugger, www.perens.com/FreeSoftware, 10 pages, (Mar. 20, 2006).
Phrack Magazine, "The Frame Pointer Overwriting," 55(9): 1-9 (Sep. 1999).
Prasad, M. and Chiueh., T., "A Binary Rewriting Defense against Stack-Based Buffer Overflow Attacks," USENIX Technical Conference, 14 pages (Jun. 2003).
Prevelakis, V. and Spinellis, D., "Sandboxing Applications" Proceedings of the 2001 USENIX Annual Technical Conference (FREENIX Track), Boston, MA, 8 pages (Jun. 2001).
Proves, N., "Improving Host Security with System Call Policies," Proceedings of the 12th USENIX Security Symposium, Washington, DC, 15 pages (Aug. 2003).
Pyo, Changwoo and Lee, Gyungho, "Encoding Function Pointers and Memory Arrangement Checking Against Buffer Overflow Attack," $4^{th}$ International Conference Information and Communications Security (ICICS), pp. 25-36 (Dec. 2002).
RATS website. Secure Software Inc., http://www.securesw.com/downloadrats.htm, retrieved from Internet 2009.
Robbins, Tim, "How to Stop a Hacker . . . ", Feb. 2001, 2 pages, Retrieved from Internet: http://box3n.gumbynet.org.
Robertson, W., "Run-time Detection of Heap-based Overflows," Proceedings of the 17th Large Installation Systems Administrators Conference, San Diego, CA, 15 pages (Oct. 2003).
Rugina, R. and Rinard, M., "Symbolic Bounds Analysis of Pointers, Array Indices, and Accessed Memory Regions," Proceedings of the ACM SIGPLAN Conference on Programming Language Design and Implementation, Vancouver, BC, Canada, 14 pages (Jun. 2000).
Ruwase, O. and Lam, M.S., "A Practical Dynamic Buffer Overflow Detector," Proceedings of the 11th Annual Network and Distributed System Security Symposium, San Diego, CA, 11 pages (Feb. 2004).
Schneider, F. B., "Enforceable Security Policies," ACM Transactions on Information and System Security, 3(1): 30-50 (Feb. 2000).
Sekar, R., et al., "A Fast Automaton-Based Method for Detecting Anomalous Program Behaviors," Proceedings of the IEEE Symposium on Security and Privacy, Oakland, CA, 12 pages (May 2001).
Simon, A. and King, A., "Analyzing String Buffers in C," In Proc. Intl. Conference on Algebraic Methodology and Software Technology, LNCS 2422: 365-380 (Sep. 2002).

Simon, I., "A Comparative Analysis of Methods of Defense against Buffer Overflow Attacks," Technical report, California State Univ, 2001. [http://www.mcs.csuhayward.edu/~simon/security/boflo.html], 11 pages (Jan. 2001).
Small, C., "A Tool For Constructing Safe Extensible C++ Systems," $3^{rd}$ USENIX Conference—Object-Oriented Technologies, Portland, OR, pp. 175-184 (Jun. 1997).
Snarskii, Alexander, Freebsd libc stack integrity patch, ftp://ftp.lucky.net/pub/unix/local/libc-letter, 5 pages (Feb. 1997).
Steffen, J. L., "Adding Run-Time Checking to the Portable C Compiler," Software: Practice and Experience, 22(4): 305-316 (Apr. 1992).
Suffield, A., "Bounds Checking for C and C++," Technical Report, Imperial College, 55 pages (2003).
Tanenbaum, A S., "Distributed Operating Systems," Prentice Hall, (1995), Table of Contents included only, 4 pages, Published Date: Aug. 25, 1994.
The NX Bit. Wikipedia article, www.wikipedia.org/wiki/NXbit, 9 pages, retrieved from Internet—Feb. 3, 2009.
The PaX project. Powepoint presentation, Nov. 9, 2000, 13 pages, Retrieved from internet: http://pageexec.virtualave.net.
VendiVendicator, Stack Shield, "A 'stack smashing' technique protection tool for Linux," http://www.angelfire.com/sk/stackshield, 1 page, (Jan. 2000) (retrieved from Internet Feb. 2010).
Viega, J., et al., "ITS4: A Static Vulnerability Scanner for C and C++ Code," Proceedings of the 16th Annual Computer Security Applications Conference, New Orleans, LA, 11 pages (Dec. 2000).
VMware Server 2, Product DataSheet; VMWare Virtual Server, http://www.vmware.com.; retrieved from Internet, 2 pages, Feb. 3, 2010.
Wagner, D. and Dean, D., "Intrusion Detection via Static Analysis," IEEE Symposium on Security and Privacy, Oakland, CA, pp. 156-168 (May 2001).
Wagner, D., et al., "A First Step Towards Automated Detection of Buffer Overrun Vulnerabilities," Proceedings of the Networking and Distributed System Security Symposium, San Diego, CA, 15 pages (Feb. 2000).
Wahbe, R., "Efficient Software-Based Fault Isolation," Proceedings of the 14th ACM Symposium on Operating System Principles, Asheville, NC, 14 pages (Dec. 1993).
Wheeler, David, Flawfinderwebsite, retrieved from Internet: https://www.dwheeler.com/flawfinder/, 11 pages, (Jun. 2001).
Wojtczuk, R., "Defeating Solar Designer's Non-executable Stack Patch," http://www.openwall.com, 11 pages (Jan. 1998).
www.cert.org, Computer Emergency Response Team (CERT), 2 pages, retrieved from Internet Feb. 3, 2009.
www.metasploit.org, "Metasploit Projects," 3 pages, retrieved from Internet Feb. 3, 2009.
X86 Assembly Guide, University of Virginia Computer Science CS216: Program and Data Representation, 17 pages, Spring 2006 [retrieved from Internet Feb. 26, 2016] http://www.cs.virginia.edu/~evans/cs216/guides/x86.html.
Xie, Y., et al., "ARCHER: Using Symbolic, Path-sensitive Analysis to Detect Memory Access Errors," Proceedings of the 9th European Software Engineering Conference, Helsinki, Finland, 14 pages (Sep. 2003).
Xu, J., et al., "Architecture Support for Defending Against Buffer Overflow Attacks," Proceedings of the Second Workshop on Evaluating and Architecting System dependability, San Jose, CA, 8 pages (Oct. 2002).
Xu, J., et al., "Transparent Runtime Randomization for Security," Proceedings of the 22nd International Symposium on Reliable Distributed Systems (SRDS'03), Florence, Italy, 10 pages (Oct. 2003).
Yong, Suan Hsi and Horwitz, Susan, "Protecting C Programs from Attacks Via Invalid Pointer Dereferences," Proceedings of the 9th European Software Engineering Conference, 10 pages (Sep. 2003).
Zhu, G. and Tyagi, Z., "Protection Against Indirect Overflow Attacks on Pointers," Second Intl. Workshop on Information Assurance Workshop, pp. 97-106 (Apr. 2004).

* cited by examiner

SYSTEMS AND METHODS FOR REMEDIATING MEMORY CORRUPTION IN A COMPUTER APPLICATION

RELATED APPLICATION

This application is the U.S. National Stage of International Application No. PCT/US2017/037841, filed Jun. 16, 2017, which designates the U.S., published in English, and claims the benefit of U.S. Provisional Application No. 62/350,917, filed Jun. 16, 2016. The entire teachings of the above applications are incorporated herein by reference in their entirety.

BACKGROUND

Network accessible applications are often vulnerable to memory corruption attacks triggered remotely by malicious attackers. Malicious attackers have strived hard to exploit such vulnerability since it gives them unprecedented access to the remote user's computer network, often with elevated privileges. Once control has been seized, arbitrary code of the attacker's choosing can be executed by the attacker, as if the remote user owns the compromised machine. Usually the objective of the malicious attacker is to extract personal and/or confidential information from the user, but the objective could also include disrupting personal or business activity of the user for the purpose of inflicting loss of productivity.

Preparatory attacks may help to set the stage by placing strategic data in buffers on the stack, the heap segments, and other jump tables, including imports, exports, virtual pointers (VPTRs), and system call/system dispatch tables in the memory address space of the application. This allows subsequently launched attacks to manipulate the flow of execution, with the ultimate objective of causing code designed by a malicious hacker to execute instead of code that is natively part of the application. The most sophisticated attackers do not even need to insert their malicious code directly into the target application's memory space, instead, the attackers can re-purpose existing code by stitching together selectively chosen (i.e., cherry picked) chunks of code from the legitimately loaded application code and thereby execute their nefarious intent. There is an urgent need to protect the application at runtime from such advanced runtime memory corruption attacks.

SUMMARY

Embodiments of the present disclosure are directed to example systems and methods for protection against malicious attacks that are facilitated through memory corruption within one or more running processes. In some embodiments, the systems include one or more instrumentation engines and one or more analysis engines for performing operations to protect against malicious attacks. The one or more instrumentation engines may be located on the same or different hardware or computer system as the one or more analysis engines. In some embodiments, the systems and methods may extract a model of a computer application as the application code first loads into memory. The model may include, but is not limited to, building pairs of legal source and destination memory addresses, transitions, basic block boundary information, code segment bounds, import and export address table bounds, jump table bounds, or any other type of computer-routine-related information known to one skilled in the art. In some embodiments, the systems and methods may store the model of the computer application.

In some embodiments, the systems and methods may insert instructions into the computer application (optionally, at run time) prior to the computer application instructions being executed in memory in order to collect data at runtime and/or the execution state of the application. In some embodiments, the systems and methods may analyze the collected data at runtime against the stored model of the computer application to perform detection of one or more security events. In some embodiments, the systems and methods may, based upon the detection of the one or more security events, modify, in a manner that preserves continued execution of the computer application, at least one computer routine associated with at least one active process associated with the computer application (i.e., insert a patch).

According to some embodiments, the computer routine may be executed in association with the at least one process. In some embodiments, the one or more detected security events may be associated with a malicious movement to a different (unusual) code path within the computer application. Such a malicious movement may include, but is not limited to, a malicious jump routine, a trampoline to malicious code, an indirect jump vector, or any other malicious movement known to one skilled in the art.

In response to receipt of one or more aggregate patches by a user, some embodiments may perform at least one operation that modifies or removes the at least one computer routine associated with the computer application, and modifying or removing one or more individual patches associated with the computer application. According to some embodiments, modifying may include verifying a patch or configuration associated with the computer application. According to some embodiments, the systems and methods may modify the stack associated with the at least one computer routine. In some embodiments, the systems and methods may modify one or more heaps associated with the at least one executing computer routine. In some other embodiments, the systems and methods may modify one or more jump tables.

Further, in some embodiments, the systems and methods may modify the at least one computer routine associated with the at least one process, while the at least one active process is executing the at least one computer routine. As such, some embodiments may employ hot patching (or live patching, or dynamic software patching/updating). According to some embodiments, a replacement function (i.e., different function) may be called as a result of a hot patch. In some embodiments, the systems and methods may, prior to modifying the at least one computer routine, pause execution of at least one active process (or computer application). In some embodiments, after modifying the at least one computer instruction, the systems and methods may resume execution of the at least one active process.

In some embodiments, the systems and methods may extract a model of a computer application during load time. According to some embodiments, the systems and methods may store the model of the computer application. In some embodiments, the systems and methods may insert instructions into the computer application (optionally, in memory) prior to the computer application being executed in memory in order to collect data at runtime. In some embodiments, the systems and methods may analyze the data collected at runtime against the stored model of the computer application to perform detection of one or more security events. In some embodiments, the systems and methods may, upon the detection of the one or more security events, temporarily remediate memory corruption associated with the computer application (i.e., restore one or more pointers) prior to executing one or more return instructions. In some embodiments, the systems and methods may report actionable information (i.e., report information to a vendor to create a patch) based upon the one or more detected security events. The actionable information may include, but is not limited to, information such as: where/how a security event occurs, where/how a trampoline takes place, and where/how the memory in the stack or heap of a vulnerable function is corrupted.

In some embodiments, the systems and methods may modify, in a manner that preserves continued execution of the computer application, at least one computer routine associated with at least one process. In some embodiments, when a lite or full patch from the vendor is received by a user, an application runtime monitoring and analysis (AR-MAS) application may be disabled, and new code may be loaded into computer memory associated with the process (i.e., a different location in memory) without shutting the process down. Some embodiments may deploy such lite patches released by a vendor as a shared static or dynamic library. Further, in some embodiments, the systems and methods may modify at least one computer instruction associated with at least one process, while the at least one process is executing. In some embodiments, the systems and methods may, prior to modifying the at least one computer instruction, pause execution of at least one process associated with the computer application. In some embodiments, after modifying the at least one computer instruction, the systems and methods may resume execution of the at least one process.

Some embodiments may remediate or prevent malicious attacks in real time until a patch is deployed. Some embodiments may provide an actionable remediation path to software vendor's developers. Some embodiments may detect heap based code and/or stack based code trampolines in real time. Some embodiments may hot-deploy lite patches (i.e., perform hot patching) without process termination. In other words, some embodiments may download and verify a lite patch, stop running all threads in the process temporarily, hot-patch a binary, and finally restart all the threads in the process (and/or application). Some embodiments may tie (i.e., associate) and track state of which patch is tied to which routine in which parent binary. Such state may include, but not be limited to, a checksum associated with the lite patch, and the address in the original binary itself. Some embodiments may untie (i.e., disassociate) a state that is presently associated with the process, either before or after deploying the patch. Some embodiments may protect a state relationship from hackers. By modifying one or more states (or associating or disassociating on or more states from a patch), some embodiments may protect a state relationship from hackers. Some embodiments include protection, including, but not limited to: (a) verification of a checksum associated with (or included in) a patch, (b) obtaining another copy of an original patch that is deleted, and/or (c) encrypting contents of a patch, thereby preventing man-in-the-middle (MIM) attacks as well as deliberate/accidental deletion.

In example embodiments, the systems and methods, for one or more code vulnerabilities of a computer application, map each of the code vulnerabilities to a respective system response in a table in memory (e.g., in a security policy database). In some example embodiments, at least one code vulnerability, and mapped system response, is provided from developers of the computer application. In some example embodiments, at least one of the code vulnerabilities and mapped system response is automatically determined by a code analyzer at load time or runtime of the computer application. The systems and methods next detect an event accessing a code vulnerability of the computer application.

The systems and methods, in response to the detection of the event, determine a system response mapped to the accessed code vulnerability in the table in memory. In some embodiments, an exception is triggered in response to an inappropriate operation by the application, such as inappropriately accessing the vulnerable code. The systems and methods instrument an exception handler to overwrite the kernel mode exception handler. The systems and methods intercept the triggered exception and associate the code vulnerability by an instrumented exception handler. In these embodiments, the systems and methods include querying, by the instrumented exception handler, the associated code vulnerability in the table. The querying returns the system response, configured as a system callback routine, mapped to the code vulnerability. The systems and methods execute the determined system response to prevent the event from exploiting the accessed code vulnerability. For example, the systems and methods execute the system callback routine to initiate instructions to prevent the event from exploiting the code vulnerability.

The system response (e.g., initiated instructions by the system callback routine) may include one or more of: logging the accessing of the code vulnerability as an error in a system log, dumping an image of an application process containing the accessed code vulnerability, restoring a copy of computer application prior to the accessing of the code vulnerability, dynamically loading one or more remedial patches from memory to modify at least one computer routine containing the code vulnerability, without restarting the computer application, continuing execution of the computer application until it terminates (e.g., crashes) based on the accessed code vulnerability, and terminating proactively the computer application.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

Figure 1:
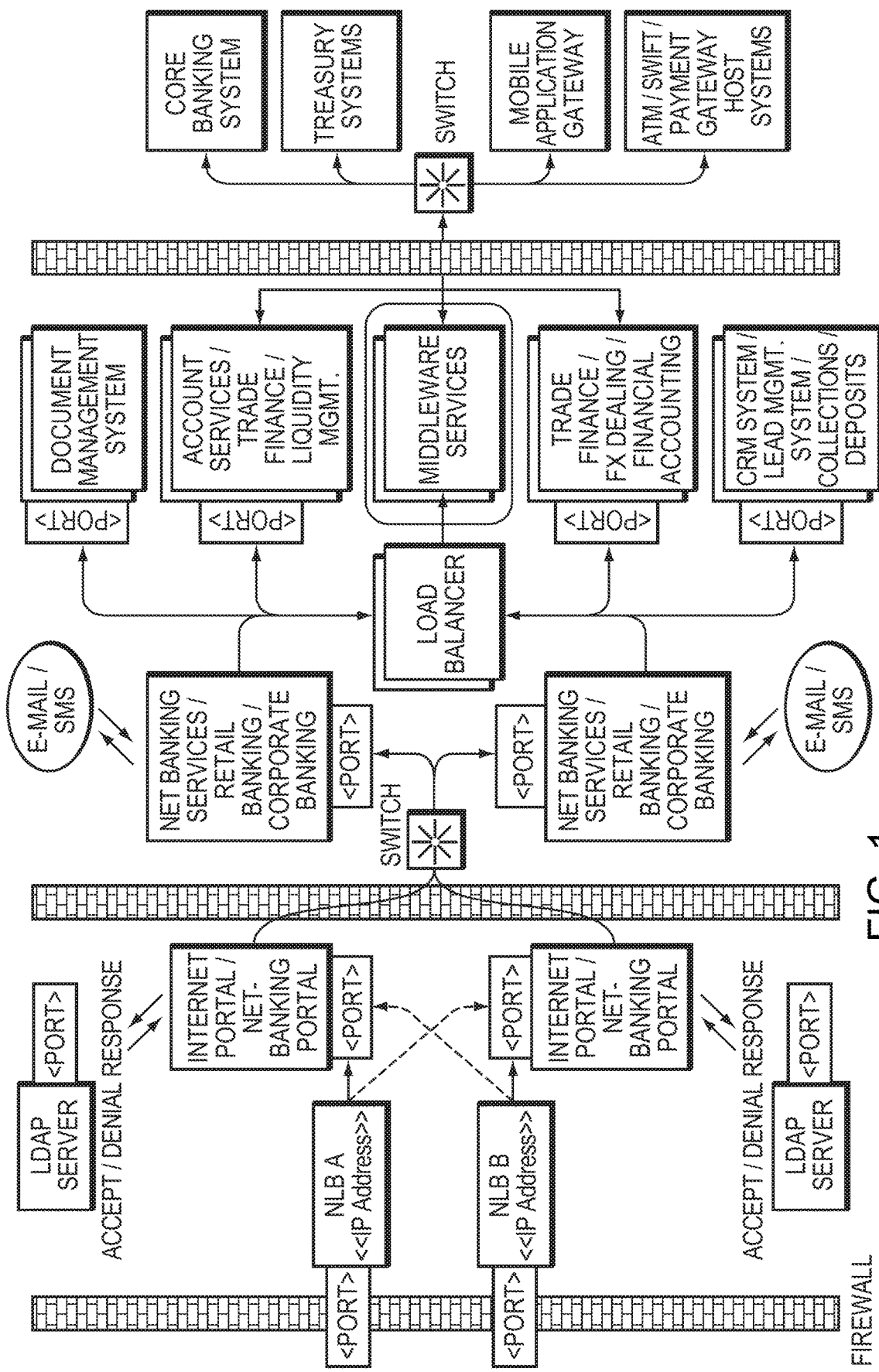
FIG. 1 illustrates an example application infrastructure, according to some embodiments of the present disclosure.

A description of example embodiments of the invention follows. In an application infrastructure of a data center for an enterprise, such as the one shown in FIG. 1, web servers receive incoming web requests (e.g., HTTP requests) from users (or from other machines through web services). However, the embodiments illustrated in FIG. 1 are not limited to a web application infrastructure or a data center, and may include, but are not limited to personal, enterprise, cloud-based and industrial control applications. In response to a web request, a web server authenticates the web service, and if the authentication is successful, establishes a session for the remote user to access information from the enterprise system (via web servers, portals, and application servers) in response to further web requests. The web service may access information from various applications, such as account services, trade finance, financial accounting, document management, and any other application without limitation, executing on computers of the enterprise system.

The web server internally maintains user and session (i.e., state) related data for the session, but does not pass on this data to the next server when forwarding an incoming request to one or more application servers for processing. That is, the user and session data is terminated at the web server of the web application infrastructure of FIG. 1 in the demilitarized zones. Then, when the application server sends the web server a response to the web request, the web server references the user and session data to determine which user (identified by their user name or IP address) to send the response. A web server may maintain the user and session data for simultaneously managing thousands of web sessions in this manner. Some of the thousands of web sessions (user and session data) may belong to hackers that are attempting to exploit code vulnerabilities in the various applications executing on the computers of the enterprise system (and corrupt those applications).

Overview of Malware Attacks

The National Vulnerability Database (NVD) enumerated approximately 4100 application vulnerabilities in 2011 and approximately 5300 application vulnerabilities in 2012, which are divided into twenty-three attack categories. While a few of the attack categories result from negligence or misconfiguration, the largest number of attack categories involve a malicious actor purposely injecting, and later causing execution of, malicious content in an executing process of an organization. The process of injecting such malicious content involves identifying and exploiting some poorly designed code that performs inadequate input validation. For example, if the code lacks in user input size related validation, the code may allow buffer error style attacks that are included in the Buffer Errors attack category. In these attacks, the malicious actors are injecting malicious content in an attempt to infiltrate, determine content of value and then ex-filtrating such content. Malicious actors may also mutilate such content for profit. Content may include confidential information, such as credit card data, intellectual property, and social security numbers. The malicious actor may then use this confidential information to profit by selling this information to the highest bidder.

Example System Detecting Attacks

Figure 2:
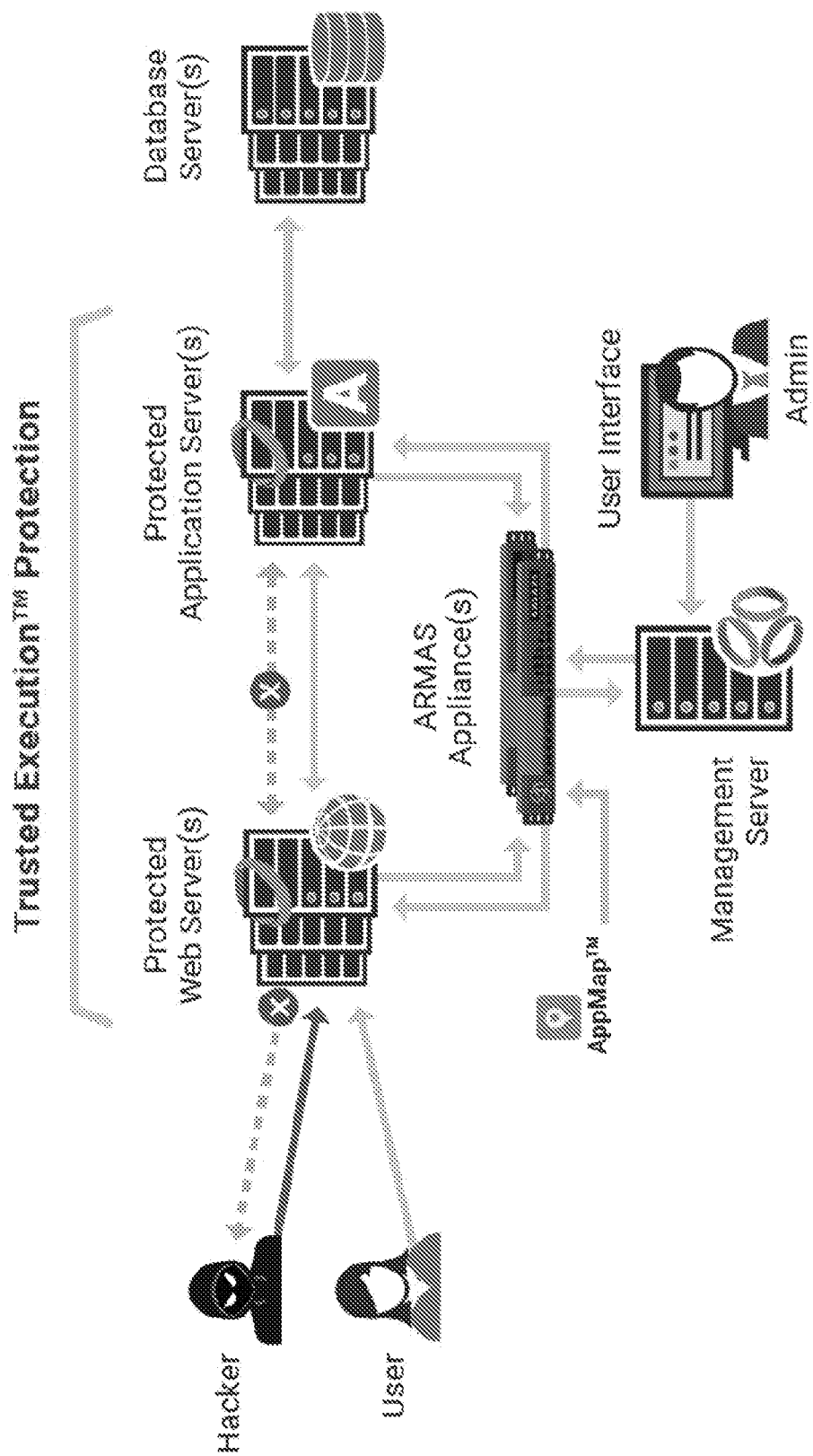
FIG. 2 illustrates an example user-interaction with the application infrastructure of FIG. 1, according to some embodiments.

FIG. 2 illustrates example interactions within the web application infrastructure of FIG. 1. In a web application infrastructure (as shown in FIG. 2), a protected web server receives a web request (e.g., HTTP requests) from a user (via a web service client). Using information included in the web request (e.g., URL), the web server authenticates the web service user, and if the authentication is successful, establishes a connection (or session) for the web service user to access data within the web application infrastructure.

While connected to the application, an attacker may obtain access to code in memory through a trampoline. However, the application runtime monitoring and analysis (ARMAS) appliance of FIG. 2 communicates with the application to detect such memory corruption. Once such memory corruption is detected, the ARMAS appliance utilizes the shadow stack or Function Pointer Jump Table (which has stored the known pre-corruption state) in order to temporarily restore the application to its known pre-corruption state. The unauthorized access may then be declared a security attack by a malicious adversary, which may be reported by the management server on the user interface for attack notification and corrective remedial action. Then, the ARMAS appliance, in communication with the management server, may obtain one or more patches and push the one or more patches out the affected servers, in order to remediate the corruption caused due to the hacker. In other embodiments, the ARMAS appliance may instead dynamically execute other responses at the web service, such as logging an error in relation to the corrupted memory (code instructions), dump an image of the application process containing the corrupted memory (e.g., a core dump), allow the corrupted application to continue executing until it terminates in a crash, or any other system response without limitation.

Figure 3A:
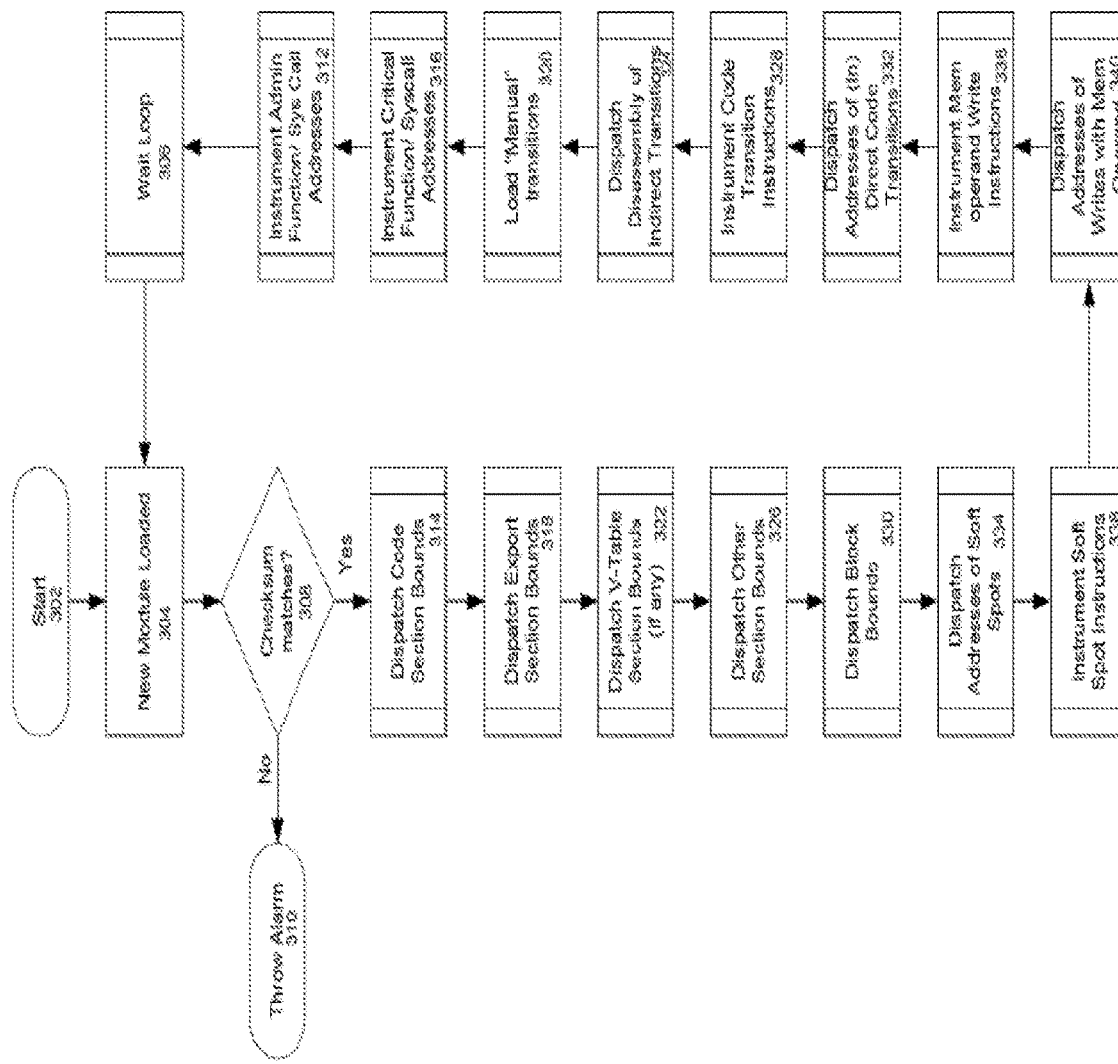
FIG. 3A shows an example flow chart of load time operations executed by a client.

FIG. 3A shows the operations that an example client referred to herein as the Monitoring Agent (also known as "Resolve Client," according to some embodiments) may perform at load time to prepare for detecting malware activity, in accordance with principles of the present disclosure. Some embodiments may include one or more corresponding Application Maps and/or Application Map Databases as described in the "Automated Runtime Detection of Malware," PCT Application No. U.S. 2014/055469 (also PCT Publication No. WO2015/038944, filed Sep. 12, 2014, incorporated herein by reference in its entirety), or other techniques known in the art. The Path Validation Engine is part of the Monitoring Agent that can reliably detect malware activity within microseconds from the point the malware starts to run. The Monitoring Agent first verifies the integrity and then analyzes each module of the application in order to extract a model of the application. The model of the application is stored in an Application Map Database that may contain the following tables: Code Table, Export Table, V Table, Other Table, Basic Block Table, Soft Spot Table, Memory Operand Table, Transition Table, Disassembly Table, and Critical OS Functions Table. In the embodiment in FIG. 3A, the Application Map Database is located on a remote system from the Monitoring Agent. In other embodiments, the Application Map Database can be saved on the same hardware where the application is executing or on hardware external to both the Monitoring Agent and Analysis Engine. The Monitoring Agent uses a Streaming Engine to package the extracted model of the application into Resolve Protocol Data Units (PDUs) to dispatch the data to be stored in the Application Map Database on the analysis system.

After the Monitoring Agent starts processing individual executable components of the application at load time at 302, the same operations are performed in a loop for each module of the computer application at 304 and 306. As each module of the application loads in memory, the Monitoring Agent examines all the instructions of the given module. The modules of the application file are in a standard file format, such as a Portable Executable (PE), Executable and Linkable Format (ELF) or Common Object File Format (COFF). In this format, the modules of the application are organized into sections that include a code section, exported data section, v-table section, and many other additional sections. As each module of the application loads in memory, the Monitoring Agent extracts relevant information as part of the model of the application. The bounds and access attributes of the code section of the module are dispatched and saved to the Application Map Database in the Code Table at 314. Each record in this table is of the form {Start Address, End Address}. The bounds and number of instructions of each basic block in the code section of the module are dispatched and saved in the Application Map database in the Basic Block Table at 330. Each record in this table is of the form {Start Address, End Address, and Number of instructions}. The bounds and access attributes of the exported data section of the module are saved in the Application Map database in the Export Table at 318. Each record in this table is of the form {Start Address, End Address}. The bounds and access attributes of a v-table section (if any) of the module are dispatched and saved in the Application Map database in the V Table at 322. Each record in this table is of the form {Start Address, End Address}. The bounds and access attributes of all other sections of the module are dispatched and saved in the Application Map database in the Other Table at 326. Each record in this table is of the form {Start Address, End Address, and Protection Attributes}.

As each module loads into memory, the Monitoring Agent also extracts other memory mapping data 336 and soft spot data 334 from the modules of the application. Memory mapping data includes instructions for memory allocation, memory de-allocation, and memory writes to critical segments of memory. Soft spot data includes instructions for manipulating large memory buffers (spot spots) including instructions that execute loops (such as instructions with REP style opcodes). The address of soft spot instructions and the size of each memory write are dispatched and saved in the Application Map database in the Soft Spot Table at 334. Each record in this table is of the form {Address, Write size}. The address and the write size will be stored for memory write instructions where the destination is a memory operand. This data is stored in the Application Map Database in the Memory Operand Write Table at 340. Each record in this table is of the form {Source Address, Memory Write Size}.

As each module of the application loads into memory, the Monitoring Agent also extracts transition mapping data (branch transfer or transition data) from the module. The transition mapping data can be for a direct transition mapping where transition instructions for the target address can be presently determined or for an indirect memory mapping where transition instructions for the target address have run time dependency preventing these instructions from being fully determined until runtime. The full disassembly of instructions where indirect transitions occur are dispatched and saved in the Application Map Database in the Disassembly Table at 324. All the extracted transition mappings are also dispatched and saved in the Application Map Database in the Transition Table at 324 and 332. Each record in this table is of the form {Source Address, Destination Address}. In addition, an operator can manually add Transition Mapping Data into the Map Transition Table prior to runtime at 320. In order to add records manually into the Map Transition Table, an operator may be required to authenticate themselves using a 2-factor authentication process to eliminate possible tampering of the Transition Table by malware.

As each module of the application loads into memory, the Monitoring Agent also checks the application for integrity at 308. In one embodiment, this is accomplished by computing a checksum such as the MD5 hash of the code as it is loading and comparing it against its corresponding known good checksum saved in a Checksum database. Alternatively, a trusted checksum verification service can also be leveraged. This ensures that the code of the currently loading module is not already corrupted with malware. The Monitoring Agent may be configured to throw an alarm if the integrity check fails at 310.

At load time, particular OS functions and system calls that affect access permissions and privileges are also identified and their addresses are dispatched and saved in the Critical OS Functions Table at 312 and 316. The particular OS functions and system calls dispatched by the Monitoring Agent have long reaching effects on the execution path of the executable. These administrative and critical OS functions and system calls change access permissions of memory segments, bump up access privileges, change the no-execute policy, change the Structured Exception Handler protection, shut down the Address Space Layout Randomization policy, allocate and de-allocate memory, create a new process, create a new thread, or are involved in encrypting and decrypting data.

As each module of the application loads into memory, the Monitoring Agent additionally instruments instructions that are inserted into the module of the application to collect data at runtime. The instrumented code is inserted into the modules of the application using a dynamic binary analysis engine and/or a byte code instrumentation engine. Soft spot instructions are instrumented in areas within the modules that malware tend to attack, such as instructions that execute loops, to collect data to track activities in these areas at runtime at 338. Direct and indirect transition mapping instructions are instrumented in the modules to collect data to track activities involving transition mappings at runtime at 328. Memory Operand Write instructions are instrumented in the modules to collect data on memory write activities at runtime at 336. In the presence of self-modifying code, the basic blocks may change at run time. Additionally, instructions are instrumented in the application to collect data for activities involving OS functions and systems calls stored in the Critical OS Function Table at 312 and 316.

As a result of the instrumentation inserted at load time, critical information is generated at run time and collected for analysis. As the transition mapping data related instrumentation is accessed, the Resolve Client collects the thread ID, current instruction address, destination instruction address and optionally data contained in each general purpose register. As the Soft Spot instrumentation is accessed before the instruction is executed, the Monitoring Agent captures the thread ID and the bounds of the stack through appropriate registers. As the soft spot instrumentation is completed, the Monitoring Agent captures the thread ID and a few general purpose registers that allow it to estimate the region of memory updated by this write operation. As the critical API or OS call instrumentation is accessed before the call is executed, the Monitoring Agent captures the thread ID, API name or System Call number and input parameters. As the critical API or OS call instrumentation is accessed after the call is executed, the Monitoring Agent captures the thread ID, API name or System Call number and return value. Instrumentation in the OS functions or system calls that allocate or de-allocate memory helps to track the regions of memory that are currently involved in the various heaps the application may have created. This memory envelope is leveraged to track the target of indirect memory writes run time in order to find if the malware wants to overrun control structures in the heap. In addition, by tracking the bounds of basic blocks using a cache, the Analysis Engine can determine if the basic block has changed. When the determination is positive, the Basic Block Table in the model database can be updated.

Methods of Preventing Attack

Figure 3B:
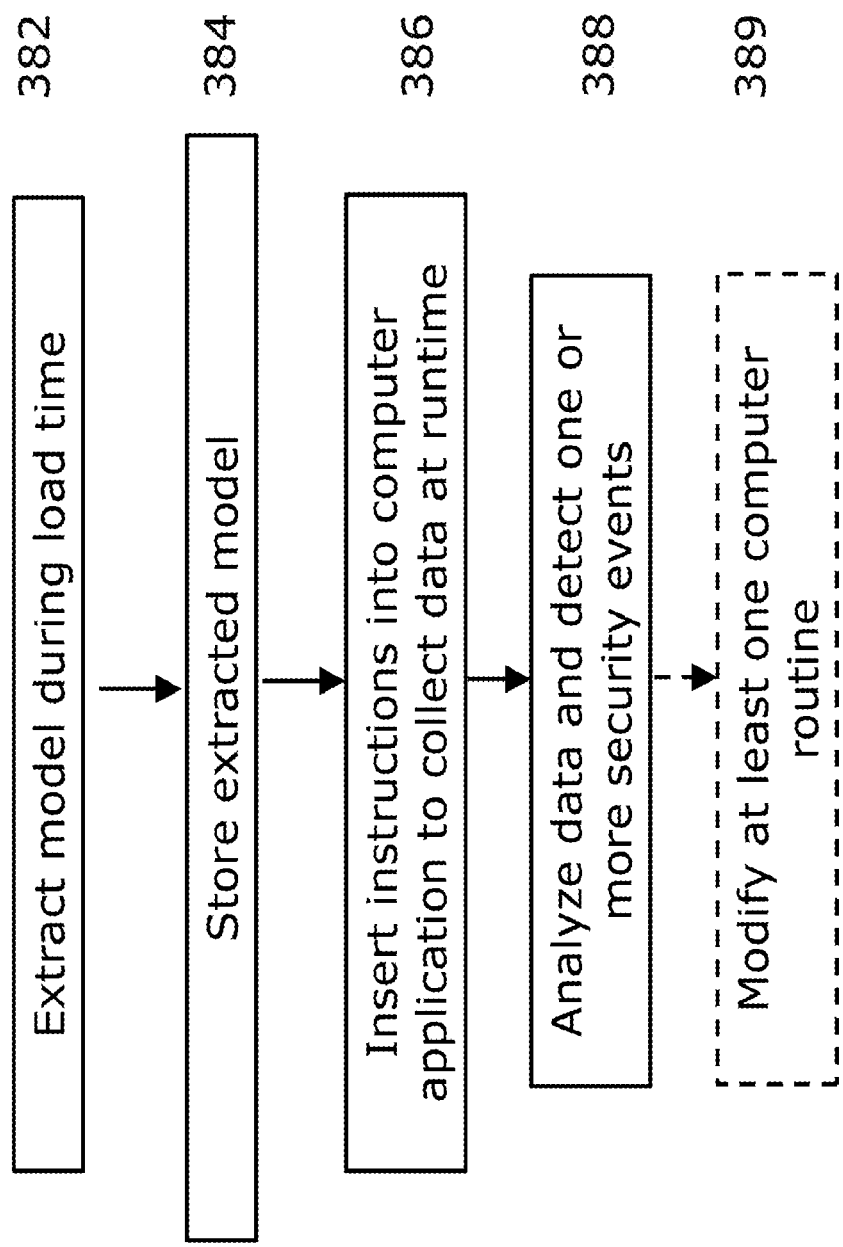
FIG. 3B illustrates a flowchart of an example method (and system) for protection against malicious attacks that are facilitated through memory corruption, in embodiments of the present disclosure.

FIG. 3B illustrates a flowchart of an example method (and system) 300 for protection against malicious attacks that are facilitated through memory corruption, in embodiments of the present disclosure. In some embodiments, the systems and methods may extract 382 a model of a computer application during load time. The model may include, but is not limited to, source information (e.g., source memory addresses), destination information (e.g., destination memory addresses), transitions, branch boundary information, basic block boundary information, code segment bounds, import and export table bounds, jump table bounds, or any other type of computer-routine-related information known to one skilled in the art. The systems and methods may store 384 the model of the computer application. The systems and methods may insert 386 instructions into the computer application to collect data at runtime. The systems and methods may analyze 388 the data collected at runtime against the stored model of the computer application to perform detection of one or more security events. The systems and methods may, based upon the detection of the one or more security events, modify 389 at least one computer routine associated with at least one active process associated with the computer application (i.e., insert a patch).

Embodiments of the method (and system) 300 remedy/protect against various types of attacks. Those attacks that target process memory at runtime present many serious technical and operational challenges (which are remedied by some embodiments). For example, most cyber security solutions do not have the ability to observe operations in process memory at the granularity that is required to deterministically declare if an attack is in progress or not. As a result, sophisticated memory based attacks like APTs (advanced persistent threats) can go undetected for years. Ordinarily, until a process running vulnerable code is restarted, such code cannot be swapped out for non-vulnerable code. As a result, the enterprise is forced into one of two unpalatable choices—keep running and become a target for even the most unsophisticated attacker, or reboot and suffer from discontinuity of operations and revenue. An attack that leverages sophisticated memory corruption may begin with the application's control flow being maliciously altered, such that instead of the application's own code executing thereafter, adversary driven code begins to execute. Another outcome of application code ceding control may be that in other attack scenarios, the application may take an unhandled exception and crash. This form of attack is effectively a denial of service attack.

Figure 3C:
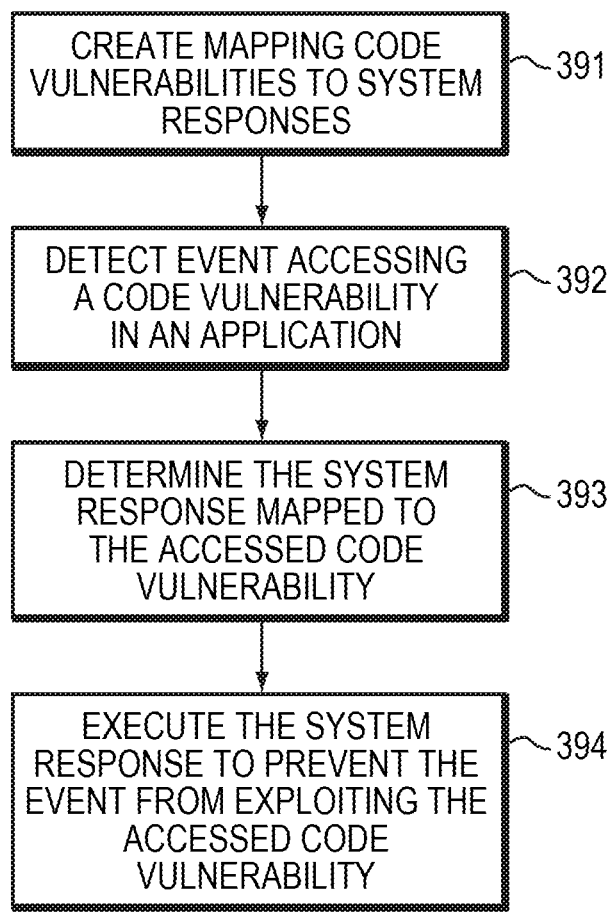
FIG. 3C illustrates a flowchart of an example method (and system) for protection against malicious attacks that exploit code vulnerabilities to cause memory corruption, in embodiments of the present disclosure.

FIG. 3C is a flowchart of an example method (and system) 390 for protection against malicious attacks that exploit code vulnerabilities to cause memory corruption, in embodiments of the present disclosure. The method 390 creates 391 a security policy database in memory of the web service infrastructure of FIG. 2 (or other system infrastructure). The security policy database includes tables of policies, which map code vulnerabilities of a computer application to corresponding system responses. The code vulnerabilities and mapped system responses may be provided by a development team (or other individuals) associated with the computer application, or automatically or statically determined by a code analyzer or other such system tool (e.g., of the ARMAS appliance) analyzing the code of the computer application at load time or runtime. The method 390 detects 392 an event accessing vulnerable code (a code vulnerability) of the computer application. For example, the accessing of the vulnerable code may cause a memory access violation or other memory or system violation, which triggers an unhandled hardware or software exception which would normally cause the thread or process of the application executing the vulnerable code to terminate (i.e., crash). In other embodiments, the method 390 may compare a saved copy of the computer application to the presently loaded or executed computer application to detect the memory corruption due to an accessed code vulnerability. In these embodiments, the method 390 may proactively trigger a hardware or software exception. The method 390 then detects the accessing of the code vulnerability by instrumenting an exception handler that intercepts (catches) the triggered hardware or software exception and associates the code vulnerability prior to the exception causing the termination of the computer application. To do so, the method 390 overwrites the kernel mode exception handler with the instrumented exception handler so that the method 390 may take control of the computer application back from the kernel and initiate a system response to the triggered exception. Otherwise, the kernel would crash the computer application in response to the triggered exception.

The method 390 provides the instrumented exception handler to include one or more instructions that automatically query the accessed code vulnerability associated with the exception in the security policy database in response to intercepting the exception. By the automatic query of the instrumented exception handler, the method 390 determines 393 the system response mapped to the accessed code vulnerability in a policy contained in the security policy database. The determined system response is retrieved from the policy in the form of a system callback routine. The instrumented exception handler automatically executes 394 the system response (i.e., system callback routine) to prevent the exploitation of the accessed code vulnerability. The system callback routine may include, without limitation, logging the accessing of the code vulnerability as an error in a system log, dumping an image of the application thread or process containing the accessed code vulnerability, restoring a saved copy of the computer application prior to accessing the code vulnerability, dynamically loading one or more remedial patches from memory in the web service infrastructure to modify the computer routine containing the code vulnerability, continue execution of the computer application until termination results (i.e., the computer application crashes) due to the memory violation, immediately terminating the computer application, or any other system response in relation to the code vulnerability.

ARMAS Probe

Figure 4A:
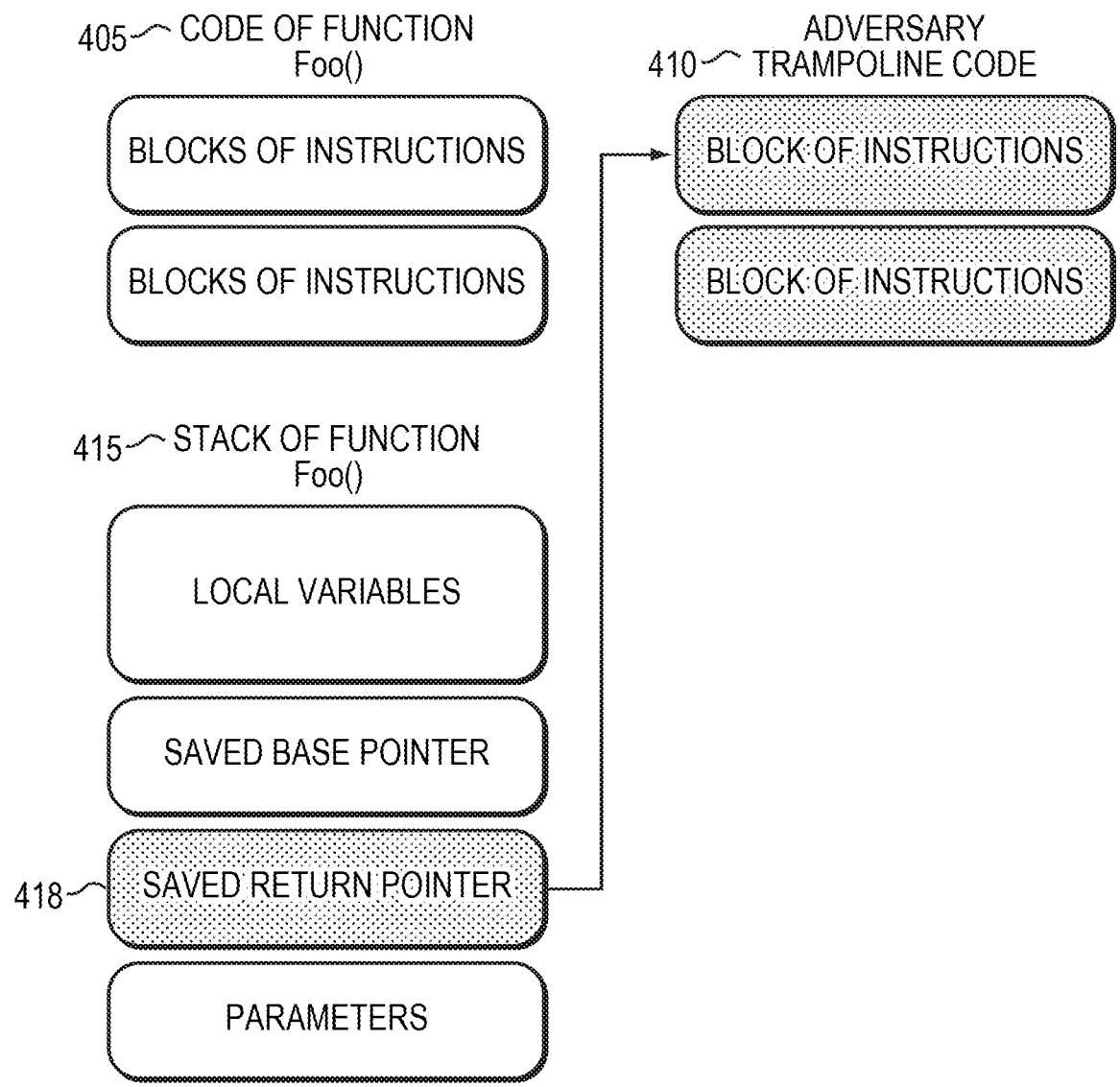
FIG. 4A is a block diagram of a memory based attack, according to some embodiments.

An example of a malicious adversary seizing control from the application is depicted in FIG. 4A. The code (blocks of instructions) 405 of a function Foo( ) may include vulnerabilities that may be exploited by an attacker. As illustrated in FIG. 4A, an adversary may flood the stack memory 415 of the vulnerable function Foo( ). As shown, the stack memory 415 of Foo( ) includes local variables, a saved base pointer, a saved return pointer 418, and parameters. When the memory location of saved return pointer of the stack memory 415 of Foo( ) is determined and overrun by an attacker, then when the Foo( ) exits (returns from the stack), the address of the next instruction may be retrieved from the saved return pointer 418 by the attacker, and the application may come under attack. Attackers may use such a technique to make a malicious movement to a different code path, such as trampoline (jump) from the application code into their own malicious code (adversary trampoline code 410).

In FIG. 4A, the target of an attack may be the Instruction Pointer Register. The attacker may also target any other register as well. Many function pointers may be declared in the application code and may be are loaded using indirect memory addresses whose value is read from various registers. By inserting malicious data in a targeted register, an attacker may alter the program execution flow. For example, the attacker may target register EAX (accumulator register) by looking for a ROP (return oriented programming) gadget that targets an instruction in code 405 of Foo( ) like:

move rax, rsp ret

This may have the effect of loading an adversary controlled value from the stack 415 into other registers such as RAX. Next, the adversary may trigger a trampoline from application code 405 of Foo( ) to their code 410 by executing an instruction such as "call [RAX]." Regardless of which register is targeted, the effect may be the same—adversary code may start to execute.

In response, embodiments include an application include a runtime monitoring and analysis (ARMAS) Probe/Application. This ARMAS Probe executes instrumented instructions in line in every thread of the process and collects source and destination information for branch transfer instructions, such as the function calls (e.g., move rax, rsp shown above) and return function calls (e.g., rets shown above) that the Probe encounters at runtime. The instrumented instructions then relay the highly granular information of the threads to the ARMAS Probe, which may make the determination whether a branch transfer is really a code trampoline into an adversary's code or not. Embodiments include a smarter ARMAS Probe, called the binary virtual patching application/probe (or "bvpProbe"), which overcomes the limitation of constantly reaching out to the ARMAS Appliance for confirmation.

According to some embodiments, the operation of the bvpProbe can be broken into three stages (stages 1 through 3, as illustrated to follow):

Stage 1 Functionality of the bvpProbe

Figure 4B:
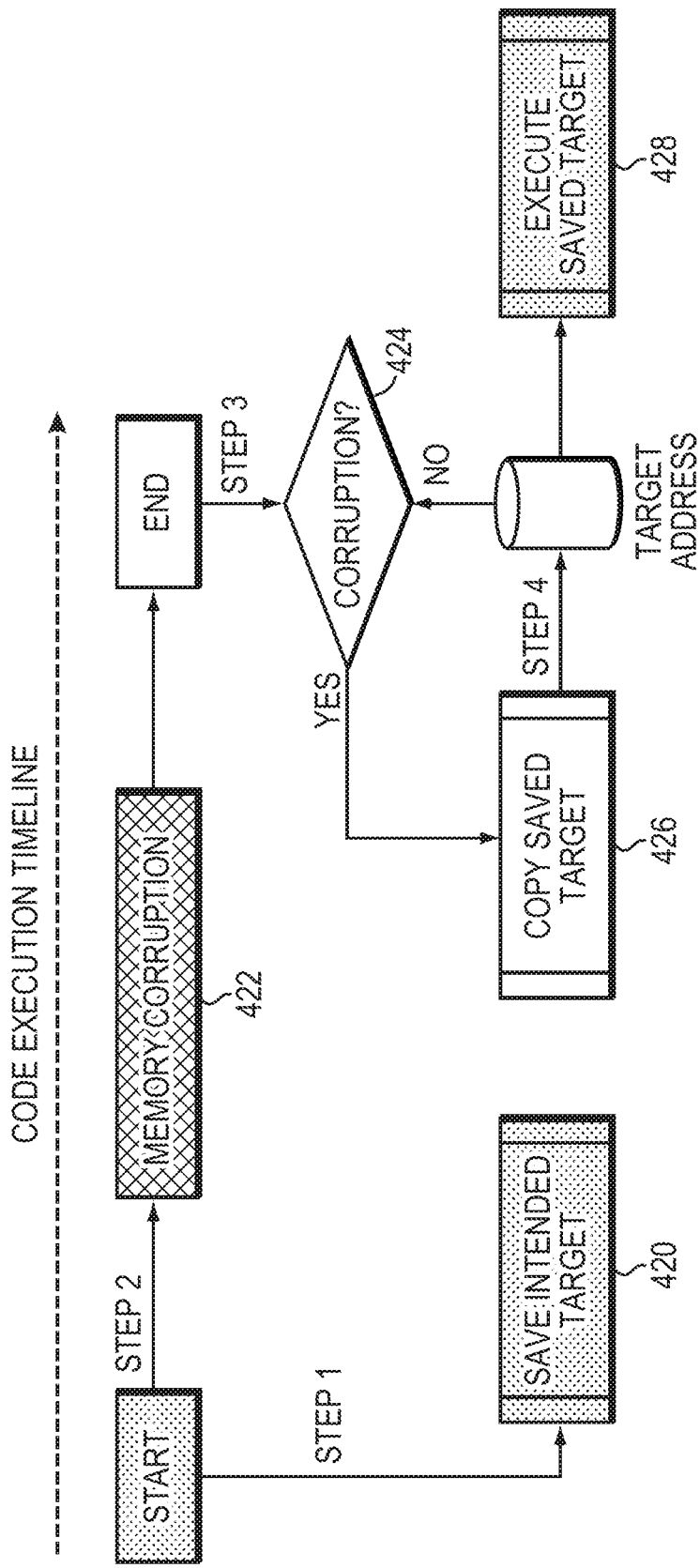
FIG. 4B is a block diagram of a first stage of stack corruption detection functionality associated with a binary virtual patching application/probe (also known as "bvp-Probe"), according to some embodiments.
Figure 4C:
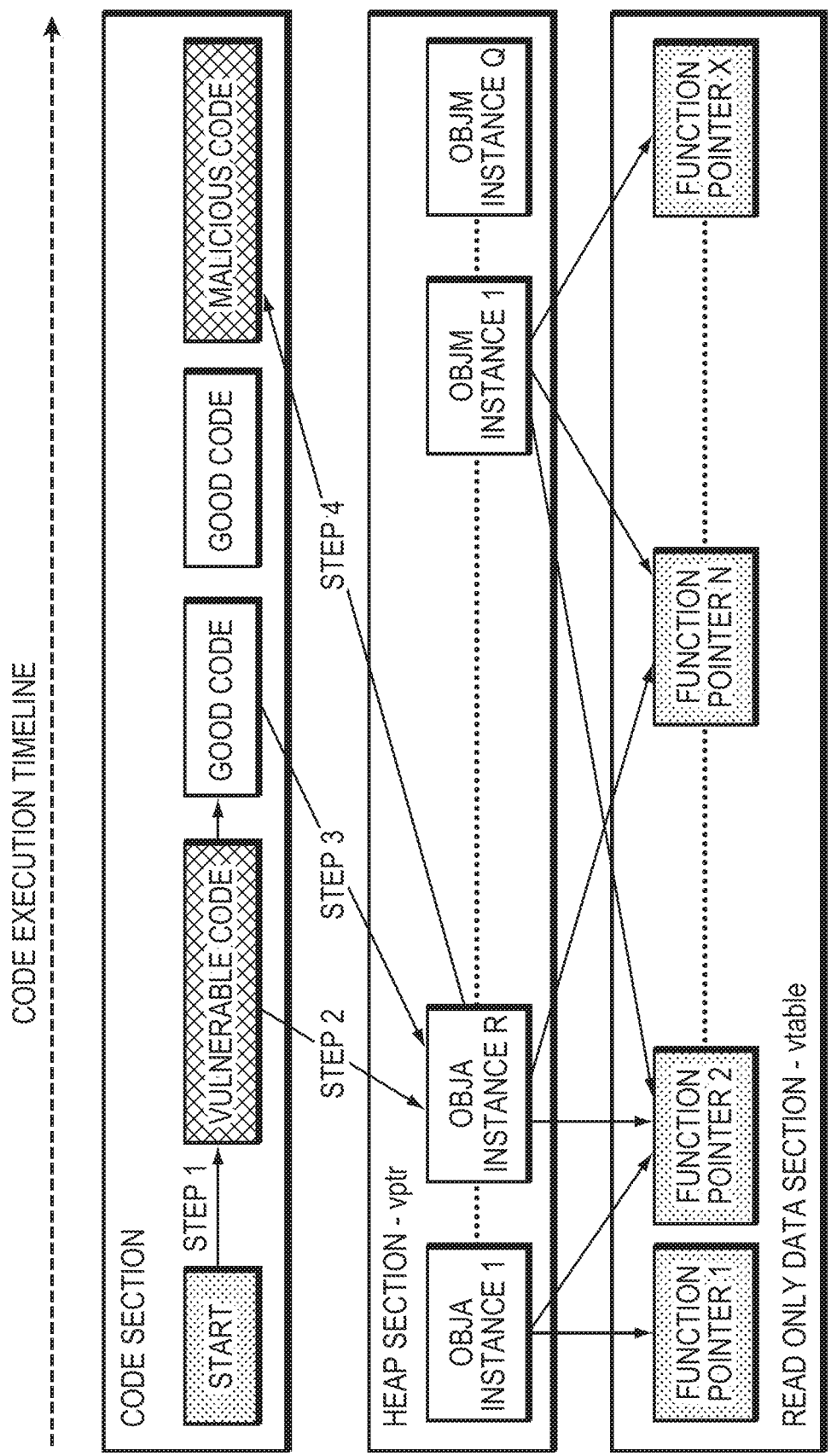
FIG. 4C is a block diagram of a first stage of heap corruption detection functionality associated with a binary virtual patching application/probe (also known as "bvp-Probe"), according to some embodiments.

The bvpProbe may protect against stack based and/or heap based attack trampolines. FIG. 4B is a block diagram of a first stage of stack corruption detection functionality associated with bvpProbe, according to some embodiments. FIG. 4C is a block diagram of a first stage of heap corruption detection functionality associated with a bvpProbe, according to some embodiments.

As illustrated in FIG. 4B, for a stack based trampoline, as a first step (step 1), some embodiments may save the intended target address 420 of the computer routine. As illustrated in FIG. 4B, in the next step (step 2), memory corruption 422 may occur by one or more attackers (e.g., as described in references to FIG. 4A). As illustrated in step 3 of FIG. 4B, some embodiments may check 424 for (detect) the memory corruption. As illustrated in step 4 if FIG. 4B, some embodiments may bypass the memory corruption by applying a copy of the saved target 426 to the target address and executing 428 the saved target. Some embodiments may handle memory corruption using one or more techniques for memory corruption handling known to those skilled in the art, including but not limited to techniques such as the "System and Methods for Run Time Detection and Correction of Memory Corruption," U.S. Pat. No. 8,966,312, or other techniques known in the art. As such, some embodiments may detect a memory corruption 424 of at least one portion of memory during run-time and correct the memory corruption of the at least one portion of memory by replacing the at least one portion of memory with a backup copy of the at least one portion of memory (i.e., the copy of the saved target 426). In this way, memory corruption may be corrected in a timely fashion while minimizing security risks.

As also illustrated in FIG. 4B, for stack based trampoline, instead of simply dispatching runtime transition data to the ARMAS Appliance, the bvpProbe may save critical state at the point of entry into a routine. If the bvpProbe determines 424 that the branch transfer operation on a given thread has been maliciously altered as shown in step 3 of FIG. 4B, it can undo the memory corruption and restores 426-428 the contextually appropriate destination by restoring the saved intended target 420 back onto the stack from where the address for the next instruction to be executed is retrieved.

FIG. 4C illustrates corruption detection and handling for heap based trampolines. As illustrated in FIG. 4C, as the application runs and executes in step 1 of FIG. 4C, adversary controlled input is written to an instance (Instance 1) of ObjA in step 2 of FIG. 4C. Instance 1 of ObjA, which contains vulnerable code, was previously declared in the heap section of application memory. Ordinarily each object (e.g., ObjA and ObjM) of the application has one or more virtual function pointers (vptrs), such as Function Pointers 1, 2 . . . N, . . . , X, that points to the common virtual pointer table (vtable) in a read only data section. According to some embodiments, function pointers may be declared in the read only data section of the application memory. When the adversary data overwrites a vptr (which correspond to vulnerable code of ObjA), the pointer from vptr to vtable may be prevented in step 2 of FIG. 4C. At some later point in time, when known good code accesses ObjA in step 3 of FIG. 4C, instead of executing a known good function pointer, the adversary chosen malicious code begins to execute as in step 4 of FIG. 4C. The bvpProbe detects the trampoline at step 4 of FIG. 4C by comparing the destinations (malicious code) with known good destinations.

Stage 2 Functionality of the bvpProbe

The bvpProbe may collect deep insight into the vulnerability and provide highly actionable information to the development team. Once the development team has developed and tested a non-vulnerable version of the vulnerable function, then the new code for that function may be packaged into a library and released as an individual patch ("lite" patch). Once a verifiable and signed version of the "lite" patch is made available at the ARMAS Dashboard, it can be pushed to one or more affected servers where the bvpProbe may be provisioned to run. The "lite" patch may be stored in memory at the affected servers, such that the "lite" patch may be injected, as necessary, from memory into a computer application (rather than repeatedly accessing from a file on the ARMAS Dashboard or over the network from a developer site).

Figure 5A:
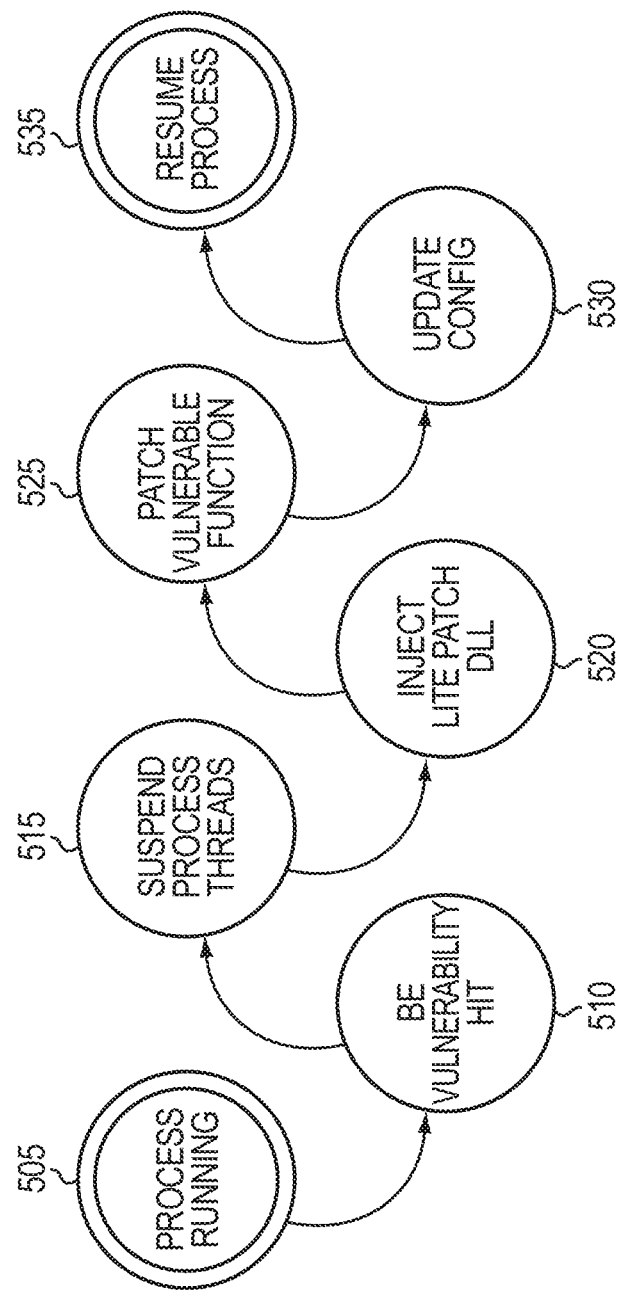
FIG. 5A illustrates patching of an individual patch of a static or dynamic linked library (DLL) or shared object in real time, according to some embodiments.

On receiving the individual patch ("lite" patch), the ARMAS probe may save the configuration data for the corresponding individual patch ("lite" patch). Then, either on user command (or automatically), or in response to an error, process threads may be suspended. As illustrated in FIG. 5A, process threads may be suspended in response to a buffer error (BE) vulnerability hit.

As illustrated in FIG. 5A, in suspending the process threads, the ARMAS probe may halt one or more threads in the application using an approach including but not limited to one or more of the following mechanisms, based on the complexity of the application. The mechanism may use intrinsics provided by the hardware running the application. A first example mechanism (method) uses the SuspendThread( ) API. In this method, a process is running 505 and branch execution vulnerability is hit 510 by an attacker. The method suspends 515 every thread in the process recursively using the SuspendThread( ) API. The method then injects 520 a lite patch DLL (as described above) into the suspended thread of the process, which patches 525 the vulnerable function and updates 530 the corresponding configuration file. Once the code has been patched, the probe can call the ResumeThread( ) API to resume 535 the process.

This approach may land a multithreaded application into operational issues due to timeouts getting truncated, race conditions due to processes waking up out of order and/or deadlock due to some lower priority thread acquiring a semaphore on being woken up. A second example mechanism is the use of one or more system calls (such as NtSuspendProcess( )) implemented in the kernel that can suspend a process. A third example mechanism is the use of the Debugger Interface (DebugActiveProcess( ) to halt and DebugActiveProcessStop( ) to resume, in order to stop the process temporarily.

As illustrated in FIG. 5A, once the process is "frozen" (i.e., suspended 515) it is safe to inject 520 new code (i.e., inject a "lite" patch DLL and perform a "hot" patch for the vulnerable function) and create trampolines from the old vulnerable code to the new non-vulnerable code. These non-malicious trampolines may be implemented using, but not limited to using, one of the following mechanisms. A first example mechanism is to directly edit the functionality in the code segment to jump to where the new "lite" functionality is loaded in memory. The second example mechanism is useful in the case that the affected functionality is an exported functionality. The second example mechanism changes the address in the import tables so that instead of the old vulnerable code being called, the new non-vulnerable code is invoked. A third example mechanism inserts code that creates an event and tie new code to the event handler.

As illustrated in FIG. 5A, the bvpProbe may wake up the suspended process (i.e., resume 535 the process). However, as also illustrated in FIG. 5A, before waking up the suspended process, configuration information may be updated 530 in the configuration file.

The configuration information may include information for multiple patches (i.e., multiple "lite" patches). It is important to save configuration related information for the patch. This configuration information may allow the bvpProbe to tie (associate) one or more individual ("lite") patches to a specific release of an executable module. Then, until the configuration is changed, the bvpProbe may reload the one or more individual ("lite") patches on start up. The configuration file itself may be a target for malicious adversaries. Therefore, configuration file contents may be encrypted with an endpoint specific "canary" and its file integrity checksum information may be published, so that the configuration file may be verified before the bvpProbe starts to utilize it for reloading patches.

It is also important that the above-mentioned operation of virtual patching (e.g., using a "lite" patch, as illustrated in FIG. 5A) may occur without the process being terminated. This is hugely important in scenarios where the application delivers mission critical operations to the enterprise, or if the cost to patch the application is large.

Figure 5B:
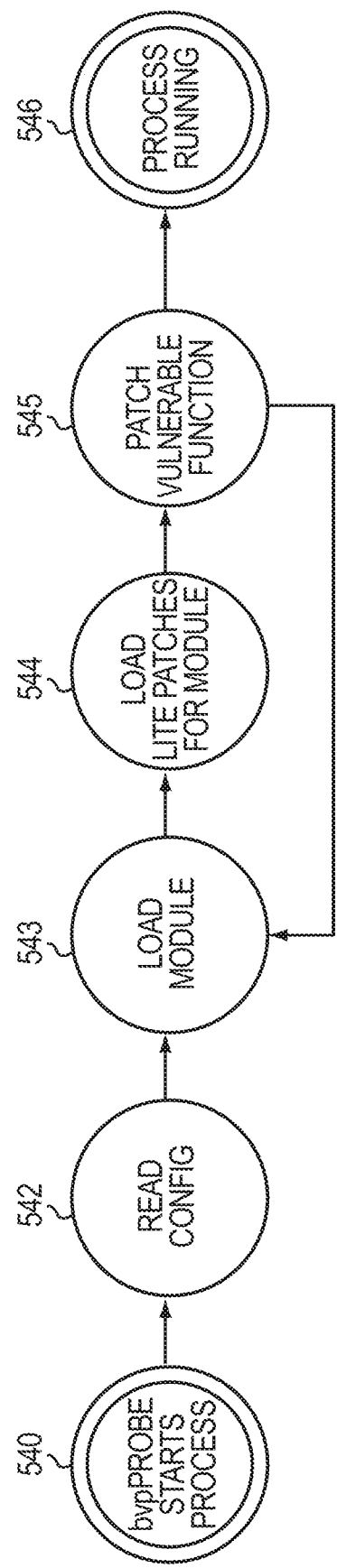
FIG. 5B illustrates loading a patch at start up, according to some embodiments.

However, as illustrated in FIG. 5B, if the process is restarted before the full patch (i.e., aggregate patch, which may include one or more individual or "lite" patches) is delivered, the "lite" patch insertion preferably occurs at start up. As illustrated in FIG. 5B, when a power cycle occurs, the bvpProbe application initiates the process 540, and reads 542 the configuration file to retrieve saved configuration information (including but not limited to patch information). Next, as illustrated in FIG. 5B, the bvpProbe application loads 543 one or more individual ("lite") patches onto each module of the application, in order to patch 545 potentially vulnerable functions for each module. After loading the desired "lite" patches, the bvpProbe may start running the application process.

Stage 3 of the bvpProbe

Figure 5C:
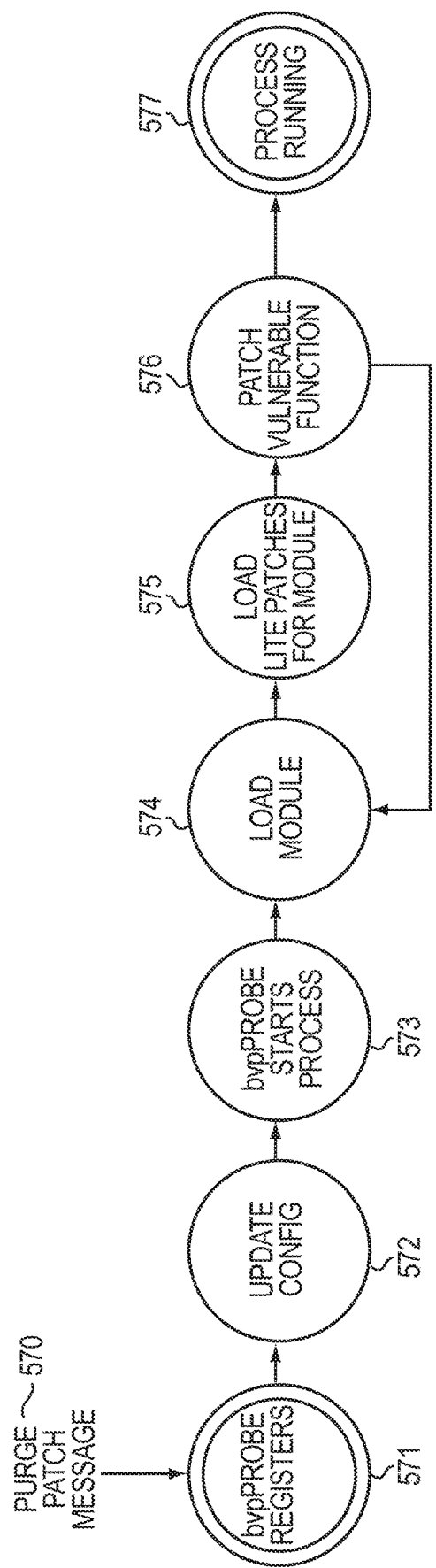
FIG. 5C illustrates a cycle associated with purging (or removing) one or more individual lite patches, according to some embodiments.

At some subsequent time, one or more users (such as a software development team) may release a full patch (i.e., aggregate patch, which may include one or more individual or "lite" patches) comprising of fixes to multiple vulnerabilities. A full patch may include one or more lite patches. At that time, one or more in-memory, "lite" patches may be explicitly removed, as illustrated in FIG. 5C. FIG. 5C illustrates a cycle associated with purging (or removing) one or more individual patches, according to some embodiments.

As illustrated in FIG. 5C, one or more communication messages (purge patch messages) may be dispatched 570 to/from the ARMAS dashboard from/to the ARMAS bvpProbe, so that the lite patch configuration information may be updated in the configuration file. The bvpProbe registers 571 the purge patch messages and update 572 the configuration file, which may include information for multiple lite patches, to reflect the most recent version(s) of lite patches that are applicable to one or more modules. In this way, the one or more versions of lite patches that are inapplicable to the one or more modules may not be loaded onto the module (i.e., "purged," or not loaded). Then, as illustrated in FIG. 5C, the bvpProbe starts 573 the process and loads 574 each module. Once the modules are loaded, the bypProbe loads 575 onto each module the applicable lite patches (but not the inapplicable lite patches), which patches 576 the corresponding potentially vulnerable functions prior to resuming the process. The bvpProbe then resumes 577 the running of the process. In this way, some embodiments may the bvpProbe purge the lite patches for which a full patch has been released.

Virtual Patching Timeline

Figure 6:
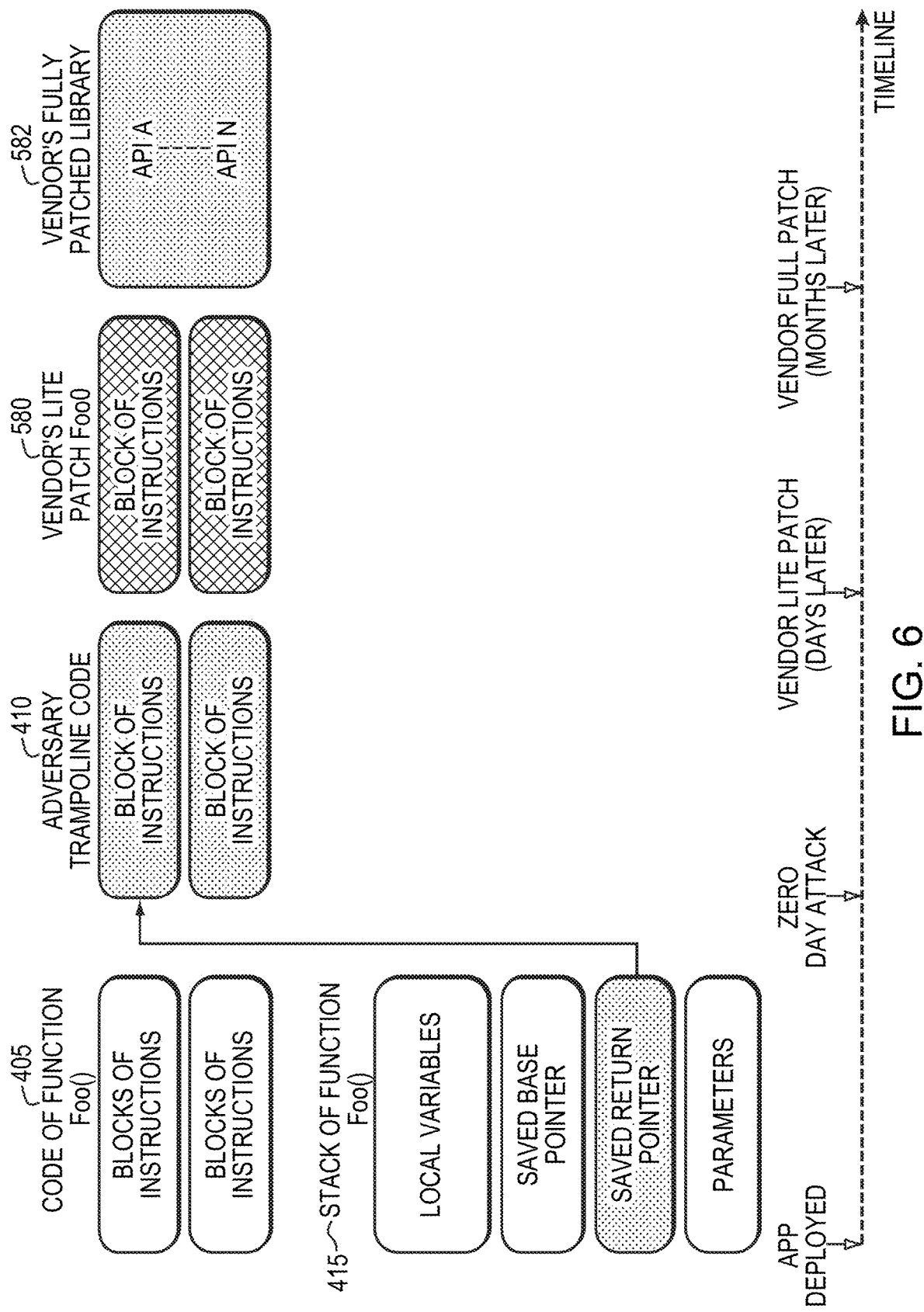
FIG. 6 is a block diagram of a patching timeline, according to some embodiments.

FIG. 6 is a block diagram of a patching timeline, as well as a summary of bvpProbe functionality (as described herein), according to some embodiments. As illustrated in the timeline of FIG. 6, after an application is deployed, a memory based attack (i.e., zero-day attack) may occur in the stack of a function, such as stack 415 of function Foo 405, as described by the memory based attack (or malicious trampoline) of FIG. 4A. As illustrated in FIG. 6, according to some embodiments, the bvpProbe (in stage 1) may inhibit the malicious trampoline (adversary trampoline code 410) that otherwise would have executed the zero-day attack. As illustrated in FIG. 6, according to some embodiments, in Stage 2, the bvpProbe may load a "lite" patch 580, and in Stage 3 the bvpProbe may revert (or remove or purge) the loaded "lite" patch 580 in lieu of a full released upgrade 582, which may require a reboot.

Virtual Patching by Exception Handling

In other embodiments, the ARMAS appliance executes a virtual patching application that can detect accessing of code vulnerabilities prior to memory corruption. In these embodiments, as development teams (e.g., application vendors) determine code vulnerabilities of an application via the use of the ARMAS application or by other means of dynamic or static code analysis (e.g., code analyzers), the code vulnerabilities of the application are configured as policies. Each configured policy includes a determined code vulnerability and a corresponding system response configured as a system callback routine. When a development team configures a policy for a determined code vulnerability, the team also programs the corresponding system callback routine to execute a recommended system response to the determined code vulnerability. The recommended system responses (programmed as callback routines) include, without limitation, logging the accessing of the code vulnerability as an error in a system log, dumping an image of the computer application thread or process containing the accessed code vulnerability, restoring a saved copy of the stack of the computer application, dynamically loading one or more remedial patches from memory in the web service infrastructure to modify the computer routine containing the code vulnerability, continue execution of the computer application until it crashes due to the memory violation, immediately terminating the computer application, or any other system response in relation to the code vulnerability. The team may also configure a default policy for the computer application with a callback routine programmed to execute one of the above recommended system responses. The configured policies are stored in tables of a security policy database that is stored at a network location accessible to the ARMAS appliance.

The ARMAS appliance instruments a hardware or software exception handler at the application servers of the network. When an unhandled memory access violation, or other unhandled memory or system violation, occurs because of an event (e.g., web service request) accesses vulnerable application code, the hardware or software (e.g., operating system) executing the application triggers an exception. The hardware or software exception handler instrumented by the ARMAS appliance intercepts the triggered exception, and associates the code vulnerability, and queries the security policy database for a policy containing the associated code vulnerability. To do so, the ARMAS appliance overwrites the kernel mode exception handler with the instrumented exception handle to take back control of the application from the kernel in order to initiate a system response to the triggered exception. Otherwise, the kernel would crash the application in response to the triggered exception. If a corresponding policy is located in the security policy database, the instrumented exception handler executes the callback routine of the policy in response to the accessing of the associated code vulnerability. If no corresponding policy is located, the instrumented exception handler executes the callback routine from the default policy for the computer application in the security policy database.

The callback routine functions as a virtual patch for responding to the vulnerability in the accessed code until a full patch, provided by the development team of the computer application, is available for download to the application server. Below is an example of the exception handle code. Option 5, shown in the example, may comprise injecting a "lite" patch saved in memory as describe above in reference to FIGS. 5A-5C.

```
catch (Exception e)
{
    virtual patch = Retrieve programmable callback from Security Policy
            database routine for code associated with unhandled
            memory violation;
Execute virtual patch;
        // Executing virtual patch may comprises one of the following
    examples:
            // Option 1: Console.WriteLine("An error occurred:
            '{0}'", e);
            // Option 2: Save process image to disk (core dump);
            // Option 3: Restore Stack and move on;
            // Option 4: Let process continue and crash;
            // Option 5: Patch process without restarting process
            // .
            // .
            // .
            // Option x (without limitation)
}
```

Application Runtime Monitoring and Analysis (ARMAS) Infrastructure

Figure 7A:
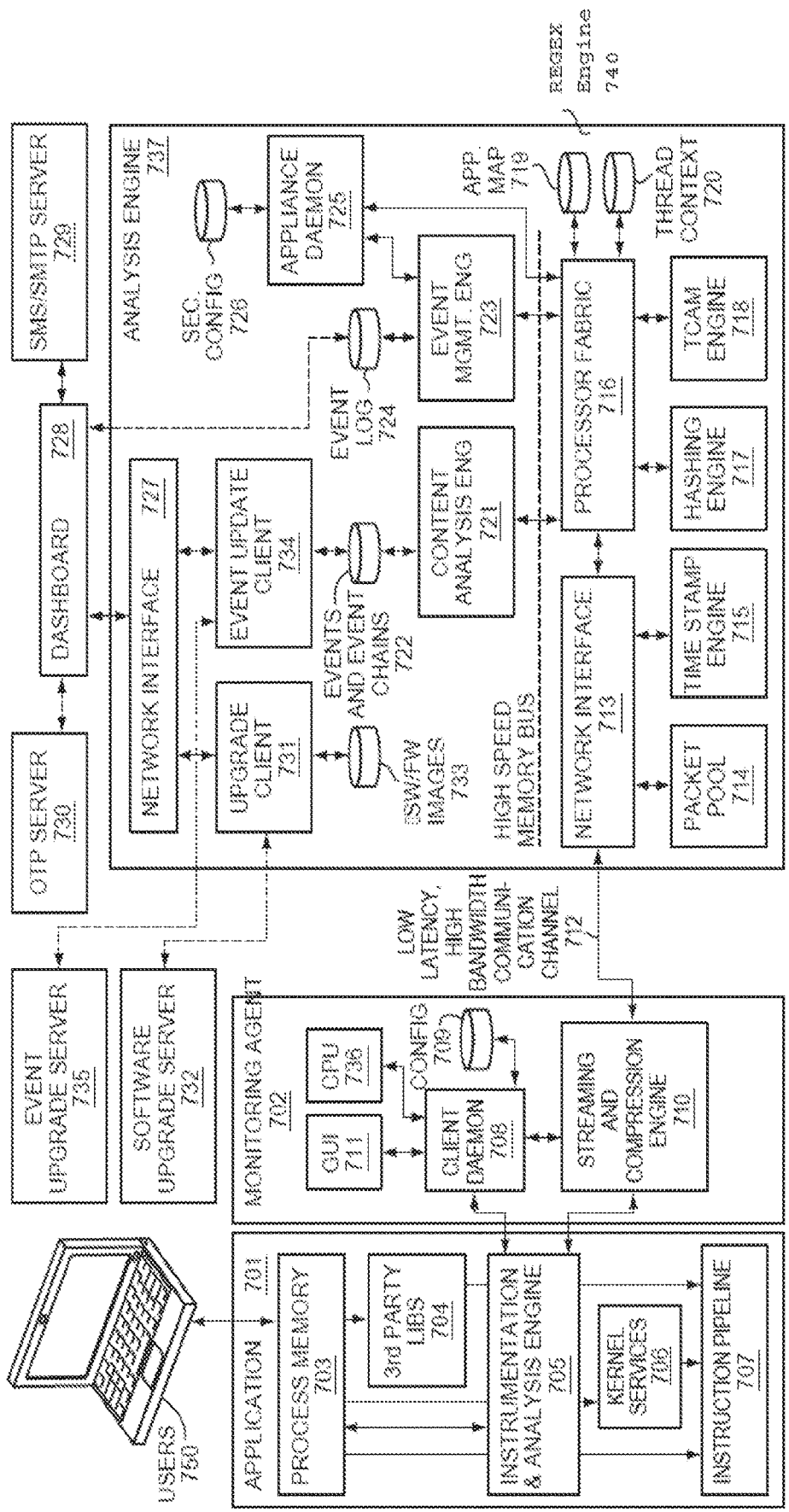
FIG. 7A illustrates an example block diagram of the application runtime monitoring and analysis solution (AR-MAS) in embodiments of the present disclosure.

FIG. 7A depicts a high level block diagram of an example application runtime monitoring and analysis (ARMAS) infrastructure. This infrastructure may be configured on a various hardware including computing devices ranging from smartphones, tablets, laptops, desktops to high end servers. As shown in this figure, data collection performed by the Monitoring Agent 702 may be segregated from analysis performed by the Analysis Engine 737 to improve application performance. The infrastructure provides high availability to prevent hackers from subverting its protection against malware attacks. The Monitoring Agent 702 interacts with an application to gather load time and runtime data. The infrastructure of the application 701 includes process memory 703, third-party libraries 704, kernel services 706, and an instruction pipeline 707. The infrastructure of the Monitoring Agent 702 includes the Instrumentation & Analysis Engine (instrumentation engine) 705, graphical user interface (GUI) 711, Client Daemon 708, Configuration database 709, and Streaming and Compression Engine 710, and central processing unit (CPU) 736. Local or remote users 750 of the application 701 interact with the application either through devices like keyboards, mice or similar I/O devices or over a network through a communication channel that may be established by means of pipes, shared memory or sockets. In response the application process 703 dispatches appropriate sets of instructions into the instruction pipeline 707 for execution. The application may also leverage its own or third party libraries 704 such as libc.so (Linux) or msvcrtxx.dll (Windows). As functionality from these libraries is invoked, appropriate instructions from these libraries are also inserted into the instruction pipeline for execution 707. In addition the application may leverage system resources such as memory, file I/O etc. from the kernel 706. These sequences of instructions from the application, libraries and the kernel put together in a time ordered sequence deliver the application functionality desired by a given user.

As the application's code begins to load into memory, the instrumentation engine 705 performs several different load time actions. Once all the modules have loaded up, the instrumented instructions of the application generate runtime data. The Client Daemon 708 initializes the Instrumentation and Analysis Engine 705, the Streaming Engine 710 and the GUI 711 processes in the CPU at 736 by reading one or more configuration files from the Configuration database 709. It also initializes intercommunication pipes between the instrumentation engine, Streaming Engine, GUI, Analysis Engine 737 and itself. The Client Daemon also ensures that if any Monitoring Agent 702 process, including itself, becomes unresponsive or dies, it will be regenerated. This ensures that the Monitoring Agent 702 is a high availability enterprise grade product.

The Instrumentation and Analysis Engine 737 pushes load and runtime data collected from the application into the Streaming Engine. The Streaming Engine packages the raw data from the Monitoring Agent 702 into the PDU. Then it pushes the PDU over a high bandwidth, low latency communication channel 712 to the Analysis Engine 737. If the Monitoring Agent 702 and the Analysis Engine 737 are located on the same machine this channel can be a memory bus. If these entities are located on different hardware but in the same physical vicinity, the channel can be an Ethernet or Fiber based transport, which allows remote connections to be established between the entities to transport the load and runtime data across the Internet.

The infrastructure of the Analysis Engine 737 includes the Network Interface Card (NIC) 713, the Packet Pool 714, the Time Stamp Engine 715, the Processor Fabric 716, the Hashing Engine 717, the TCAM Engine 718, the Application Map database 719, and the Thread Context database 720, which makes up the REGEX Engine 740. The infrastructure of the Analysis Engine 737 further includes the Content Analysis Engine 721, the Events and Event Chains 722, the Event Management Engine 723, the Event Log 724, the Application Daemon 725, the Analysis Engine Configuration database 726, the Network Interface 727, the Dashboard or CMS 728, the SMS/SMTP Server 729, the OTP Server 730, the Upgrade Client 731, the Software Upgrade Server 732, Software Images 733, the Event Update Client 734, and the Event Upgrade Server 735.

The PDU together with the protocol headers is intercepted at the Network Interface Card 713 from where the PDU is pulled and put into the Packet Pool 714. The timestamp fields in the PDU are filled up by the Time Stamp Engine 715. This helps to make sure that no packet is stuck in the packet Pool buffer for an inordinately long time.

The Processor Fabric 716 pulls packets from the packet buffer and the address fields are hashed and replaced in the appropriate location in the packet. This operation is performed by the Hashing Engine 717. Then the Processor Fabric starts removing packets from the packet buffer in the order they arrived. Packets with information from the load time phase are processed such that the relevant data is extracted and stored in the Application Map database 719. Packets with information from the runtime phase are processed in accordance with FIG. 5. The efficiency of the Analysis Engine 737 can be increased or decreased based on the number of processors in the Processor Fabric.

The transition target data is saved in the Thread Context database 720 which has a table for each thread. The Processor fabric also leverages the TCAM Engine 718 to perform transition and memory region searches. Since the processor fabric performing lookups using hashes, the actual time used is predictable and very short. By choosing the number of processors in the fabric carefully, per packet throughput can be suitable altered.

When the Analysis Engine 737 performs searches, it may, from time to time find an invalid transition, invalid operation of critical/admin functions or system calls, or find a memory write on undesirable locations. In each of these cases, the Analysis Engine 737 dispatches an event of the programmed severity as described by the policy stored in the Event and Event Chain database 722 to the Event Management Engine 723. The raw event log is stored in the Event Log Database 724. The Dashboard can also access the Event Log and display application status.

A remedial action is also associated with every event in the Event and Event Chain database 722. A user can set the remedial action from a range of actions from ignoring the event in one extreme to terminating the thread in the other extreme. A recommended remedial action can be recommended to the analyst using the Event Update Client 734 and Event Upgrade Server 735. In order to change the aforementioned recommended action, an analyst can use the Dashboard 728 accordingly. The Dashboard provides a GUI interface that displays the state of each monitored application and allows a security analyst to have certain control over the application, such as starting and stopping the application. When an event is generated, the Event Chain advances from the normal state to a subsequent state. The remedial action associated with the new state can be taken. If the remedial action involves a non-ignore action, a notification is sent to the Security Analyst using and SMS or SMTP Server 729. The SMS/SMTP address of the security analyst can be determined using an LDAP or other directory protocol. The process of starting or stopping an application from the Dashboard requires elevated privileges so the security analyst must authenticate using an OTP Server 730.

New events can also be created and linked into the Event and Event Chain database 722 with a severity and remedial action recommended to the analyst. This allows unique events and event chains for a new attack at one installation to be dispatched to other installations. For this purpose, all new events and event chains are loaded into the Event Upgrade Server 735. The Event Update Client 734 periodically connects and authenticates to the Event Upgrade Server 735 to retrieve new events and event chains. The Event Update Client then loads these new events and event chains into the Events and Events Chain database 722. The Content Analysis Engine 721 can start tracking the application for the new attacks encapsulated into the new event chains.

Just as with the Client Daemon, the Appliance Daemon 725 is responsible for starting the various processes that run on the Analysis Engine 737. For this purpose, it must read configuration information from the Analysis Engine Configuration database 726. The daemon is also responsible for running a heartbeat poll for all processes in the Analysis Engine 737. This ensures that all the devices in the Analysis Engine 373 ecosystem are in top working condition at all times. Loss of three consecutive heartbeats suggests that the targeted process is not responding. If any process has exited prematurely, the daemon will revive that process including itself.

From time to time, the software may be upgraded in the Appliance host, or of the Analysis Engine 737 or of the Client for purposes such as fixing errors in the software. For this purpose, the Upgrade Client 731 constantly checks with the Software Upgrade Server 732 where the latest software is available. If the client finds that the entities in the Analysis Engine 737 or the Client are running an older image, it will allow the analysts to upgrade the old image with a new image from the Software Upgrade Server 732. New images are bundled together as a system image 733. This makes it possible to provision the appliance or the host with tested compatible images. If one of the images of a subsystem in the Analysis Engine 737 or the Monitoring Agent 702 does not match the image for the same component in the System image, then all images will be rolled to a previous known good system image.

PDU for ARMAS Communications

Figure 7B:
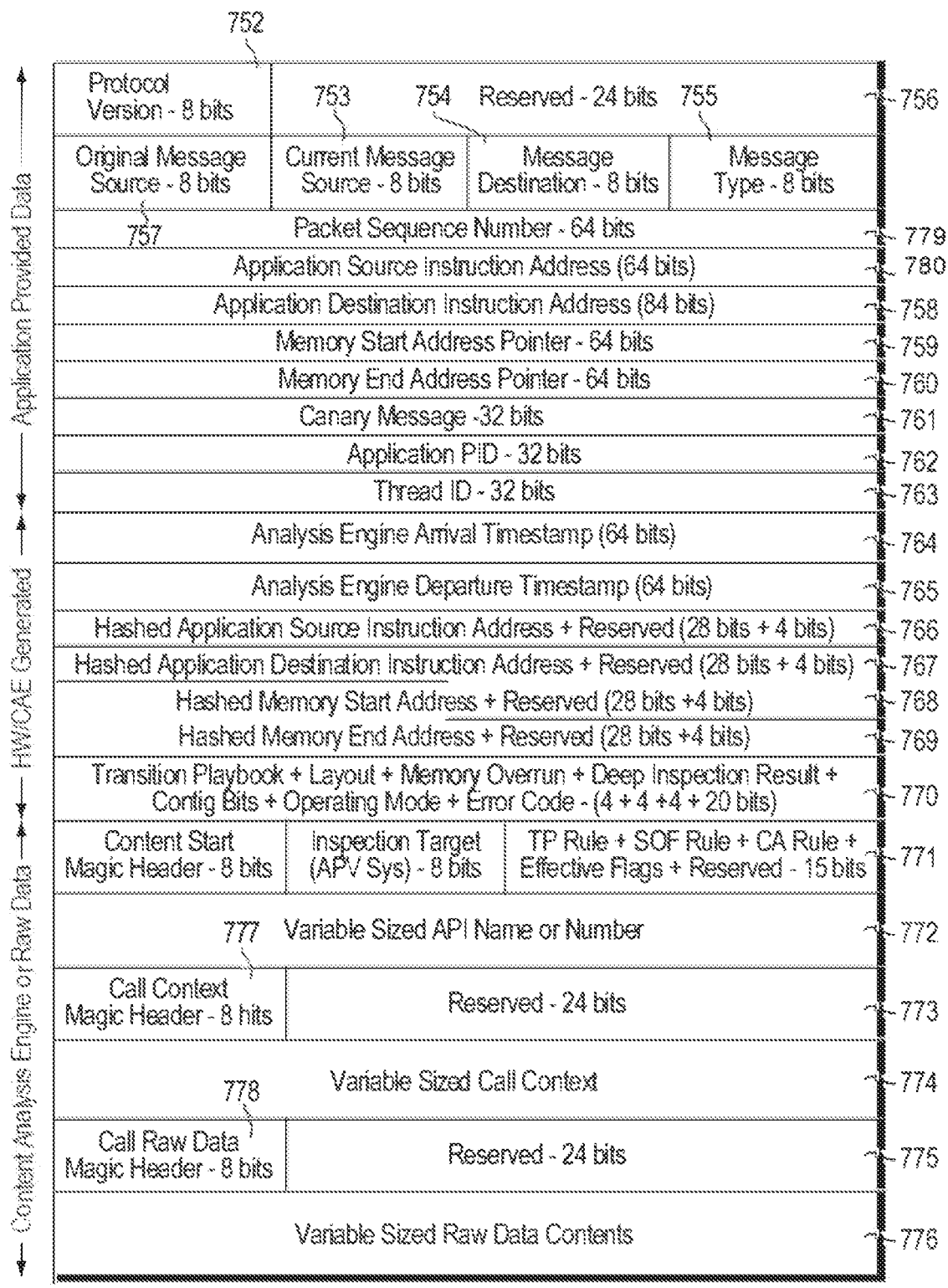
FIG. 7B illustrates an example protocol data unit (PDU) used to transmit data within the ARMAS infrastructure of FIG. 7A.

FIG. 7B illustrates an example protocol data unit (PDU) used to transmit data between the Monitoring Agent 702 and Analysis Engine 737 of FIG. 7A. In order for the Monitoring Agent 702 and the Analysis Engine 737 to work effectively with each other, they communicate with each other using the PDU. The PDU can specifically be used by the Monitoring Agent 702 to package the extracted model of the application and/or collected runtime data for transmission to the Analysis Engine 737. The PDU contains fields for each type of information to be transmitted between the Monitoring Agent 702 and the Analysis Engine 737. The PDU is divided into the Application Provided Data Section, the HW/CVE Generated, and Content Analysis Engine or Raw Data sections.

The Application Provided Data Section contains data from various registers as well as source and target addresses that are placed in the various fields of this section. The Protocol Version contains the version number of the PDU 752. As the protocol version changes over time, the source and destination must be capable of continuing to communicate with each other. This 8 bit field describes the version number of the packet as generated by the source entity. A presently unused reserved field 756 follows the Protocol Version field.

The next field of the Application Provided Data Section is the Message Source/Destination Identifiers 757, 753, and 754 are used to exchange traffic within the Analysis Engine infrastructure as shown in FIG. 7A. From time to time, the various entities shown in FIG. 7, exchange traffic between themselves. Not all these devices have or need IP addresses and therefore, the two (hardware and host) Query Router Engines uses the Message Source and Destination fields to route traffic internally. Some messages need to go across the network to entities in the Analysis Engine 737. For this purpose, the entities are assigned the following IDs. A given Analysis Engine appliance may have more than one accelerator card. Each card will have a unique IP address; therefore, the various entities will have a unique ID. The aforementioned infrastructure may also be running more than one application. Since each application server will have a unique IP address, the corresponding Monitoring Agent side entity will also have a unique ID.

Monitoring Agent Side Entities
1. GUI
2. Instrumentation and Analysis Engine
3. Client Message Router
4. Streaming Engine
5. Client Side Daemon
6. CLI Engine
7. Client Watchdog
8. Client Compression Block
9. Client iWarp Ethernet Driver (100 Mb/1 Gb/10 Gb)
Per PCI Card Entities (starting address=20+n*20)
20. Securalyzer TOE block
21. Securalyzer PCI Bridge
22. Decompression Block
23. Message Verification Block
24. Packet Hashing Block
25. Time-Stamping Block
26. Message Timeout Timer Block
27. Statistics Counter Block
28. Securalyzer Query Router Engine
29. Securalyzer Assist
Securalyzer Host Entities
200. Securalyzer PCIe Driver
201. Host Routing Engine
202. Content Analysis Engine
203. Log Manager
204. Daemon
205. Web Engine
206. Watchdog
207. IPC Messaging Bus
208. Configuration Database
209. Log Database
SIEM Connectors
220. SIEM Connector 1—Virsec Dashboard
221. SIEM Connector 2—HP ArcSight
222. SIEM Connector 3—IBM QRadar
223. SIEM Connector 4—Alien Vault USM
Securalyzer Infrastructure Entities
230. Virsec dashboard
231. SMTP Server
232. LDAP Server
233. SMS Server
234. Entitlement Server
235. Database Backup Server
236. OTP Client
237. OTP Server
238. Checksum Server
239. Ticketing Server
240. Virsec Rules Server
241. Virsec Update Server
All User Applications
255. User Applications—Application PID is used to identify the application issuing a query Another field of the Application Provided Data section is the Message Type field which indicates the type of data being transmitted 755. At the highest level, there are three distinct types of messages that flow between the various local Monitoring Agent side entities, between the Analysis Engine appliance side entities and between Client side and appliance side entities. Furthermore, messages that need to travel over a network must conform to the OSI model and other protocols.

The following field of the Application Provided Data section is the Packet Sequence Number field containing the sequence identifier for the packet 779. The Streaming Engine will perform error recovery on lost packets. For this purpose it needs to identify the packet uniquely. An incrementing signed 64 bit packet sequence number is inserted by the Streaming Engine and simply passes through the remaining Analysis Engine infrastructure. If the sequence number wraps at the 64 bit boundary, it may restart at 0. In the case of non-application packets such as heartbeat or log message etc., the packet sequence number may be −1.

The Application Provided Data section also contains the Canary Message field contains a canary used for encryption purposes 761. The Monitoring Agent 702 and the Analysis Engine 737 know how to compute the Canary from some common information but of a fresh nature such as the Application Launch time, PID, the license string, and an authorized user name.

The Application Provided Data section additionally contains generic fields that are used in all messages. The Application Source Instruction Address 780, Application Destination Instruction Address 758, Memory Start Address Pointer 759, Memory End Address Pointer 760, Application PID 762, Thread ID 763, Analysis Engine Arrival Timestamp 764, and Analysis Engine Departure Timestamp 765 fields which hold general application data.

The PDU also contains the HW/CAE Generated section. In order to facilitate analysis and to maintain a fixed time budget, the Analysis Engine 737 hashes the source and destination address fields and updates the PDU prior to processing. The HW/CAE Generated section of the PDU is where the hashed data is placed for later use. This section includes the Hashed Application Source Instruction Address 766, Hash Application Destination Instruction Address 767, Hashed Memory Start Address 768, and Hashed Memory End Address 769 fields. The HW/CAW Generated section additionally contains other fields related to the Canary 771 including the Hardcoded Content Start Magic header, API Name Magic Header, Call Context Magic Header and Call Raw Data Magic Header are present in all PDU packets.

The HW/CAW Generated section also includes a field 770 to identify other configuration and error data which includes Result, Configuration Bits, Operating Mode, Error Code, and Operating Modes data. The Result part of the field is segmented to return Boolean results for the different Analysis Engine queries—the transition playbook, the code layout, the Memory (Stack or Heap) Overrun, and the Deep Inspection queries. The Configuration Bits part of the field indicates when a Compression Flag, Demo Flag, or Co-located Flag is set. The presence of the flag in this field indicates to the Analysis Engine 737 whether the packet should be returned in compression mode. The Demo Flag indicates that system is in demo mode because there is no valid license for the system. In this mode, logs and events will not be available in their entirety. The Co-located Flag indicates that the application is being run in the Analysis Engine 737 so that Host Query Router Engine can determine where to send packets that need to return to the Application. If this flag is set, the packets are sent via the PCI Bridge, otherwise they are sent over the Ethernet interface on the PCI card. The Operating Mode part of the field indicates whether the system is in Paranoid, Monitor, or Learn mode. These modes will be discussed in more details later in this section. Lastly, the Error Code part of the field indicates an error in the system. The first eight bits of the error code will correspond to the message source. The remaining 12 bits will correspond to the actual error reported by each subsystem.

The PDU also contains the Content Analysis Engine or Raw Data. All variable data such as arguments and return value of the OS library calls and System Calls is placed in this section of the PDU. The data in this section contains the content of the data collected from the application and is primarily targeted at the Content Analysis Engine 721. This section contains the Variable Sized API Name or Number 772, the Call Content Magic Header 777, the Variable Sized Call Content 774, the Call Raw Data Magic Header 778, Variable Sized Raw Data Contents 776, and two reserved 773 and 775 fields. Furthermore, these fields can be overloaded for management messages.

Digital Processing Infrastructure

Figure 8:
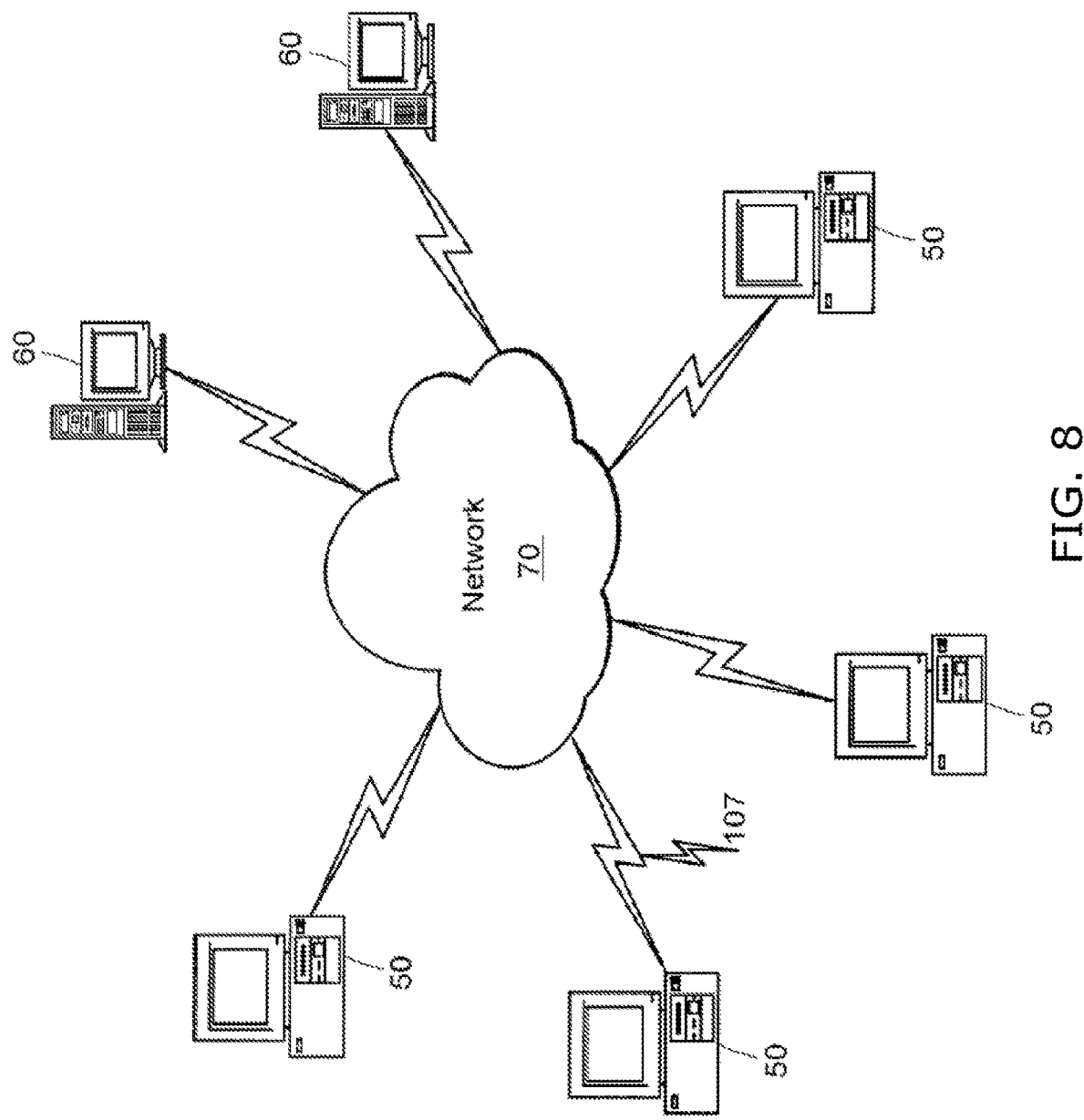
FIG. 8 illustrates a computer network or similar digital processing environment in which embodiments of the present disclosure may be implemented.

FIG. 8 illustrates a computer network or similar digital processing environment in which embodiments of the present disclosure may be implemented.

Client computer(s)/devices 50 and server computer(s) 60 provide processing, storage, and input/output devices executing application programs and the like. The client computer(s)/devices 50 can also be linked through communications network 70 to other computing devices, including other client devices/processes 50 and server computer(s) 60. The communications network 70 can be part of a remote access network, a global network (e.g., the Internet), a worldwide collection of computers, local area or wide area networks, and gateways that currently use respective protocols (TCP/IP, Bluetooth®, etc.) to communicate with one another. Other electronic device/computer network architectures are suitable.

Client computers/devices 50 may be configured as the security monitoring agent. Server computers 60 may be configured as the analysis engine which communicates with client devices (i.e., security monitoring agent) 50 for detecting database injection attacks. The server computers 60 may not be separate server computers but part of cloud network 70. In some embodiments, the server computer (e.g., analysis engine) may analyze a set of computer routines, identify one or more patches to be applied, and apply one or more patches to the computer routines. The client (security monitoring agent) 50 may communicate patches and patch requests, to/from the server (analysis engine) 60. In some embodiments, the client 50 may include client applications or components (e.g., instrumentation engine) executing on the client (i.e., security monitoring agent) 50 for capturing requests and queries, and detecting corrupted memory for which patches are required, as well as providing patches, and the client 50 may communicate this information to the server (e.g., analysis engine) 60.

Figure 9:
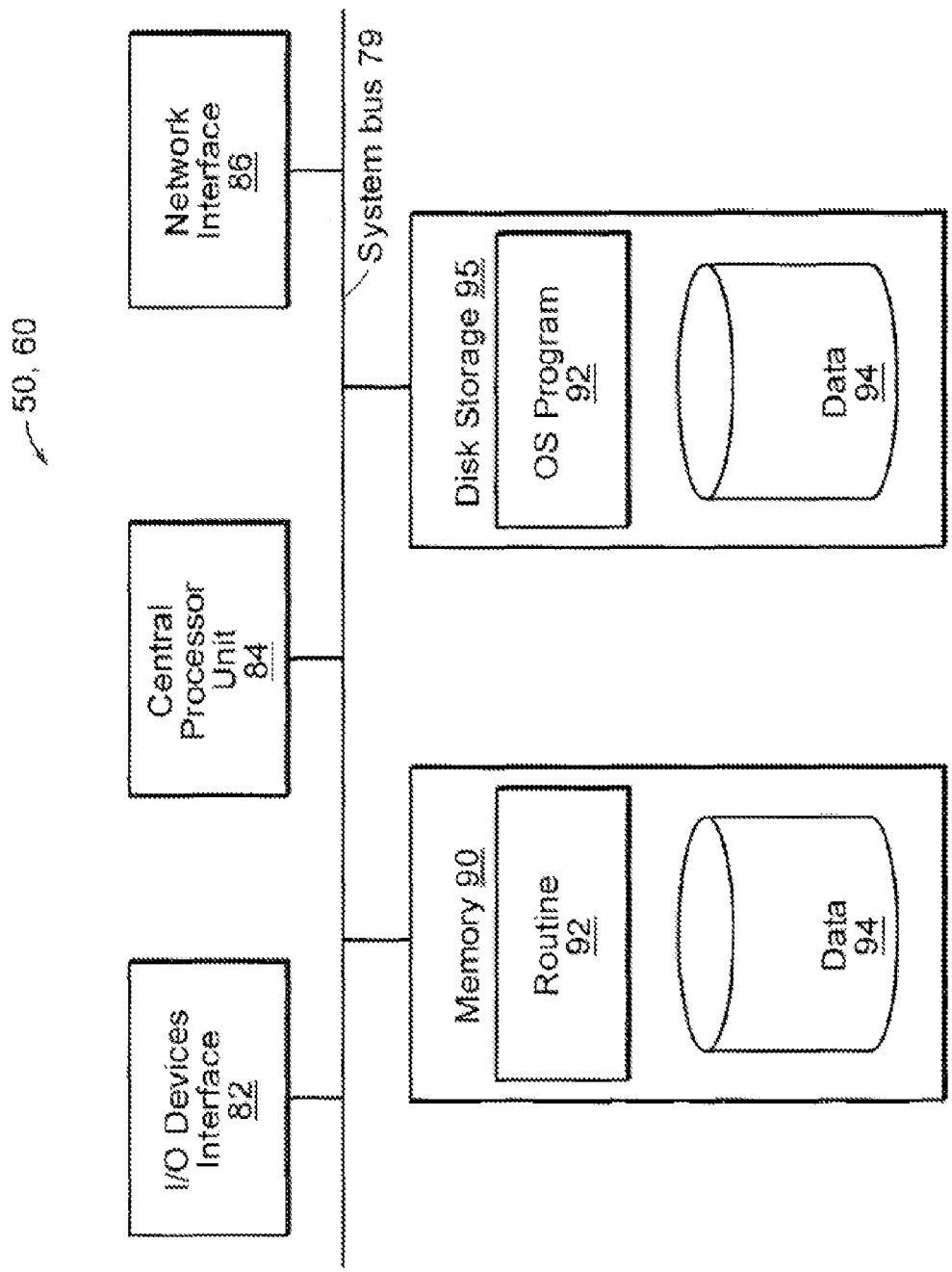
FIG. 9 illustrates a diagram of an example internal structure of a computer (e.g., client processor/device or server computers) in the computer system of FIG. 8.

FIG. 9 is a diagram of an example internal structure of a computer (e.g., client processor/device 50 or server computers 60) in the computer system of FIG. 8. Each computer 50, 60 contains a system bus 79, where a bus is a set of hardware lines used for data transfer among the components of a computer or processing system. The system bus 79 is essentially a shared conduit that connects different elements of a computer system (e.g., processor, disk storage, memory, input/output ports, network ports, etc.) that enables the transfer of information between the elements. Attached to the system bus 79 is an I/O device interface 82 for connecting various input and output devices (e.g., keyboard, mouse, displays, printers, speakers, etc.) to the computer 50, 60. A network interface 86 allows the computer to connect to various other devices attached to a network (e.g., network 70 of FIG. 8). Memory 90 provides volatile storage for computer software instructions 92 and data 94 used to implement an embodiment of the present disclosure (e.g., security monitoring agent, instrumentation engine, and analysis engine elements described herein). Disk storage 95 provides non-volatile storage for computer software instructions 92 and data 94 used to implement an embodiment of the present disclosure. A central processor unit 84 is also attached to the system bus 79 and provides for the execution of computer instructions.

Embodiments or aspects thereof may be implemented in the form of hardware including but not limited to hardware circuitry, firmware, or software. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Some embodiments may transform the behavior and/or data of a set of computer routines by asynchronously and dynamically manipulating at least one of the computer routines through patch updates. The patch may include (but is not limited to) modification of a value, input parameter, return value, or code body associated with one or more of the computer routines, thereby transforming the behavior (and/or data) of the computer routine.

Some embodiments may provide functional improvements to the quality of computer applications, computer program functionality, and/or computer code by detecting malicious handling of computer routines and/or vulnerabilities in the computer applications and/or computer code. Some embodiments may deploy one or more patches to correct and/or replace improperly executing computer routines to avoid the unexpected and/or incorrect behavior. As such, some embodiments may detect and correct computer code functionality, thereby providing a substantial functional improvement.

Some embodiments solve a technical problem (thereby providing a technical effect) by improving the robustness of functionality of software and its error handling functionality. Some embodiments also solve a technical problem of detecting and remediating code corruption that may be hard to do using existing approaches (thereby providing a technical effect).

Further, hardware, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and, thus, the data processors described herein are intended for purposes of illustration only and not as a limitation of the embodiments.

While this disclosure has been particularly shown and described with references to example embodiments thereof, it will be understood by those skilled in the art that various changes in form and details may be made therein without departing from the scope of the disclosure encompassed by the appended claims.

What is claimed is:

1. A computer-implemented method comprising:
extracting a model of a computer application during load time, the extracted model including address bounds attributes of the computer application;
storing the model of the computer application;
inserting instructions into the computer application to collect data at runtime;
analyzing the data collected at runtime against the stored model including address bounds attributes of the computer application to perform detection of one or more security events, wherein the one or more security events is associated with malicious action outside the address bounds attributes of the computer application, the malicious action being a malicious movement to a different code path within the computer application; and
based upon the detection of the one or more security events:
temporarily pausing execution of at least one active process or thread associated with the computer application;
modifying, in a manner that preserves continued execution of the computer application, at least one computer routine associated with the at least one active process or thread associated with the computer application, the modifying creating a trampoline from vulnerable code to non-vulnerable code; and
after modifying the at least one computer routine, resuming execution of the at least one active process or thread.

2. The method of claim 1 wherein the at least one computer routine is executed in association with the at least one active process.

3. The method of claim 1 wherein modifying includes verifying a patch or configuration associated with the computer application.

4. The method of claim 1 further comprising:
in response to receipt of one or more aggregate patches by a user, performing at least one of:
modifying or removing the at least one computer routine associated with the computer application; and
modifying or removing one or more individual patches associated with the computer application.

5. The method of claim 1 further comprising:
modifying one or more stacks associated with the at least one computer routine.

6. The method of claim 1 further comprising:
modifying one or more heaps associated with the at least one computer routine.

7. The method of claim 1 further comprising:
modifying the at least one computer routine associated with the at least one active process, while the at least one active process is executing the at least one computer routine.

8. A computer system comprising:
a processor; and
a memory with computer code instructions stored thereon, the processor and the memory, with the computer code instructions, being configured to cause the system to implement:
an instrumentation engine configured to:
extract a model of a computer application during load time, the extracted model including address bounds attributes of the computer application;
store the model of the computer application;

insert instructions into the computer application to collect data at runtime; and an analysis engine configured to:
analyze the data collected at runtime against the stored model including address bounds attributes of the computer application to perform detection of one or more security events, wherein the one or more security events is associated with malicious action outside the address bounds attributes of the computer application, the malicious action being a malicious movement to a different code path within the computer application; and based upon the detection of the one or more security events:
temporarily pause execution of at least one active process or thread associated with the computer application;
modify, in a manner that preserves continued execution of the computer application, at least one computer routine associated with the at least one active process or thread associated with the computer application, the modifying creating a trampoline from vulnerable code to non-vulnerable code; and
after modifying the at least one computer routine, resume execution of the at least one active process or thread.

9. The system of claim 8 wherein the at least one computer routine is executed in association with the at least one active process.

10. The system of claim 8 wherein the analysis engine is further configured to verify a patch or configuration associated with the computer application.

11. The system of claim 8, wherein the analysis engine is further configured to:
in response to receipt of one or more aggregate patches by a user, perform at least one of:
modifying or removing the at least one computer routine associated with the computer application; and
modifying or removing one or more individual patches associated with the computer application.

12. The system of claim 8, wherein the analysis engine is further configured to:
modify one or more stacks associated with the at least one computer routine.

13. The system of claim 8, wherein the analysis engine is further configured to:
modify one or more heaps associated with the at least one computer routine.

14. The system of claim 8, wherein the analysis engine is further configured to:
modify the at least one computer routine associated with the at least one active process, while the at least one active process is executing the at least one computer routine.

15. A computer-implemented method comprising:
extracting a model of a computer application during load time, the extracted model including address bounds attributes of the computer application;
storing the model of the computer application;
inserting instructions into the computer application to collect data at runtime;
analyzing the data collected at runtime against the stored model including address bounds attributes of the computer application to perform detection of one or more security events, wherein the one or more security events is associated with malicious action outside the address bounds attributes of the computer application, the malicious action being a malicious movement to a different code path within the computer application;
upon the detection of the one or more security events, temporarily remediating memory corruption associated with the computer application prior to executing one or more return instructions;
reporting actionable information based upon the one or more detected security events; and
based upon the detection of the one or more security events:
temporarily pausing execution of at least one active process or thread associated with the computer application;
modifying, in a manner that preserves continued execution of the computer application, at least one computer routine associated with at the least one active process or thread associated with the computer application, the modifying creating a trampoline from vulnerable code to non-vulnerable code; and
after modifying the at least one computer routine, resuming execution of the at least one active process or thread.

16. The method of claim 15 further comprising:
modifying at least one computer instruction associated with at least one process, while the at least one process is executing.

17. A computer system comprising:
a processor; and
a memory with computer code instructions stored thereon, the processor and the memory, with the computer code instructions, being configured to cause the system to implement:
an instrumentation engine configured to:
extract a model of a computer application during load time, the extracted model including address bounds attributes of the computer application;
store the model of the computer application;
insert instructions into the computer application to collect data at runtime; and
an analysis engine configured to:
analyze the data collected at runtime against the stored model including address bounds attributes of the computer application to perform detection of one or more security events, wherein the one or more security events is associated with malicious action outside the address bounds attributes of the computer application, the malicious action being a malicious movement to a different code path within the computer application;
upon the detection of the one or more security events, temporarily remediate memory corruption associated with the computer application prior to executing one or more return instructions;
report actionable information based upon the one or more detected security events; and
based upon the detection of the one or more security events:
temporarily pause execution of at least one active process or thread associated with the computer application;
modify, in a manner that preserves continued execution of the computer application, at least one computer routine associated with the at least one active process or thread associated with the computer application, the modifying creating a trampoline from vulnerable code to non-vulnerable code; and after modifying the at least one computer routine, resume execution of the at least one active process or thread.

18. The system of claim 17, wherein the analysis engine is further configured to:
modify at least one computer instruction associated with at least one process, while the at least one process is executing.

19. A computer-implemented method comprising:
for one or more code vulnerabilities of a computer application, mapping each code vulnerability to a respective system response in a table in memory;
detecting an event accessing a code vulnerability of the computer application, the detected event associated with malicious action outside address bounds attributes of the computer application, the malicious action being a malicious movement to a different code path within the computer application;
in response to the detection of the event:
temporarily pausing an application process or thread associated with the code vulnerability;
dynamically determining a system response mapped to the accessed code vulnerability in the table in memory;
executing the determined system response, the executing prevents the event from exploiting the accessed code vulnerability associated with the application process or thread, wherein the executing creates a trampoline from vulnerable code to non-vulnerable code; and
after executing the determined system response, resume the application process or thread.

20. The method of claim 19, wherein at least one code vulnerability and mapped system response is provided from developers of the computer application.

21. The method of claim 19, wherein at least one code vulnerability and mapped system response is automatically determined by a code analyzer at load time or runtime of the computer application.

22. The method of claim 19, wherein the system response comprises a system callback routine programmable by a system or user.

23. The method of claim 22, further comprising:
instrumenting an exception handler to overwrite a kernel mode exception handler;
triggering an exception in response to the accessing of the code vulnerability;
intercepting the triggered exception and associating the code vulnerability at the instrumented exception handler;
querying, by the instrumented exception handler, the associated code vulnerability in the table in memory, the querying returning the system callback routine mapped to the code vulnerability; and
executing, by the instrumented exception handler, the system callback routine to initiate instructions to prevent the event from exploiting the code vulnerability.

24. The method of claim 19, wherein the system response includes one or more of:
logging the accessing of the code vulnerability as an error in a system log;
dumping an image of the application process containing the accessed code vulnerability;

restoring a copy of the computer application prior to the accessing of the code vulnerability;
dynamically loading one or more remedial patches from memory, the loading using the remedial patch to modify at least one computer routine containing the code vulnerability, the loading modifying the at least one computer routine without restarting the computer application;
continuing execution of the computer application until termination results based on the accessed code vulnerability; and
terminating proactively the computer application.

25. The method of claim 24, wherein dynamically loading includes injecting the remedial patches directly from memory of a server executing the computer application.

26. A computer system comprising:
a processor; and
a memory with computer code instructions stored thereon, the processor and the memory, with the computer code instructions, being configured to cause the system to implement:
an instrumentation engine configured to:
for one or more code vulnerabilities of a computer application, map each code vulnerability to a respective system response in a table in storage memory; and
an analysis engine configured to:
detect an event accessing a code vulnerability of the computer application, the detected event associated with malicious action outside address bounds attributes of the computer application, the malicious action being a malicious movement to a different code path within the computer application;
in response to the detection of the event:
temporarily pause an application process or thread associated with the code vulnerability;
dynamically determine a system response mapped to the accessed code vulnerability in the table in storage memory;
execute the determined system response, the executing prevents the event from exploiting the accessed code vulnerability associated with the application process or thread, wherein the executing creates a trampoline from vulnerable code to non-vulnerable code; and
after executing the determined system response, resume the application process or thread.

27. The system of claim 26, wherein at least one code vulnerability and mapped system response is provided from developers of the computer application.

28. The system of claim 26, wherein at least one code vulnerability and mapped system response is automatically determined by a code analyzer at load time or runtime of the computer application.

29. The system of claim 26, wherein the system response comprises a system callback routine programmable by a system or user.

30. The system of claim 29, wherein the analysis engine is further configured to:
instrument an exception handler to overwrite a kernel mode exception handler;
trigger an exception in response to the accessing of the code vulnerability;
intercept the triggered exception and associate the code vulnerability at the instrumented exception handler;

query, by the instrumented exception handler, the associated code vulnerability in the table, the querying returning the system callback routine mapped to the code vulnerability; and execute, by the instrumented exception handler, the system callback routine to initiate instructions to prevent the event from exploiting the code vulnerability.

31. The system of claim 26, wherein the system response includes one or more of:

logging the accessing of the code vulnerability as an error in a system log;

dumping an image of the application process containing the accessed code vulnerability;

restoring a copy of the computer application prior to the accessing of the code vulnerability;

dynamically loading one or more remedial patches from memory, the loading using the remedial patch to modify at least one computer routine containing the code vulnerability, the loading modifying the at least one computer routine without restarting the computer application;

continuing execution of the computer application until termination results based on the accessed code vulnerability; and terminating proactively the computer application.

32. The system of claim 31, wherein the dynamically loading includes injecting the remedial patches directly from memory of a server executing the computer application.

* * * * *